United States Patent
Mandai et al.

(10) Patent No.: US 11,142,124 B2
(45) Date of Patent: Oct. 12, 2021

(54) ADHERED-SUBSTANCE DETECTING APPARATUS AND VEHICLE SYSTEM EQUIPPED WITH THE SAME

(71) Applicant: CLARION CO., LTD., Saitama (JP)

(72) Inventors: Kohei Mandai, Tokyo (JP); Takehito Ogata, Tokyo (JP); Daisuke Fukuda, Saitama (JP); Shuzo Kaneko, Saitama (JP)

(73) Assignee: CLARION CO., LTD., Saitama (JP)

( * ) Notice: Subject to any disclaimer, the term of this patent is extended or adjusted under 35 U.S.C. 154(b) by 0 days.

(21) Appl. No.: 16/635,663

(22) PCT Filed: Jul. 27, 2018

(86) PCT No.: PCT/JP2018/028229
§ 371 (c)(1),
(2) Date: Jan. 31, 2020

(87) PCT Pub. No.: WO2019/026785
PCT Pub. Date: Feb. 7, 2019

(65) Prior Publication Data
US 2021/0122294 A1   Apr. 29, 2021

(30) Foreign Application Priority Data

Aug. 2, 2017 (JP) .............................. JP2017-150190

(51) Int. Cl.
*B60R 1/00* (2006.01)
*G06T 7/12* (2017.01)
(Continued)

(52) U.S. Cl.
CPC ................ *B60R 1/002* (2013.01); *B60S 1/56* (2013.01); *G06T 7/001* (2013.01); *G06T 7/12* (2017.01);
(Continued)

(58) Field of Classification Search
CPC ........... B60R 1/002; G06T 7/12; G06T 7/001; G06T 7/13; G06T 2207/30252; B60S 1/56
(Continued)

(56) References Cited

U.S. PATENT DOCUMENTS

2008/0192984 A1* 8/2008 Higuchi ................. G08G 1/166
382/104
2011/0080494 A1* 4/2011 Mori .................... H04N 5/2356
348/222.1
(Continued)

FOREIGN PATENT DOCUMENTS

JP   2006262242 A   8/2006
JP   2012038048 A   2/2012
(Continued)

OTHER PUBLICATIONS

International Search Report from International Application No. PCT/JP2018/028229, dated Oct. 2, 2018.
(Continued)

*Primary Examiner* — Michael Lee
(74) *Attorney, Agent, or Firm* — Brundidge & Stanger, P.C.

(57) ABSTRACT

An adhered-substance detecting apparatus capable of detecting adhered substances such as water droplets, mud, and dust, including those with ambiguous outlines, which adhere to, for example, a lens for an imaging apparatus, and a vehicle system equipped with the adhered-substance detecting apparatus are provided.

12 Claims, 16 Drawing Sheets

(51) Int. Cl.
*G06T 7/13* (2017.01)
*B60S 1/56* (2006.01)
*G06T 7/00* (2017.01)

(52) U.S. Cl.
CPC ...... *G06T 7/13* (2017.01); *G06T 2207/30252* (2013.01)

(58) Field of Classification Search
USPC .......................................................... 348/148
See application file for complete search history.

(56) References Cited

U.S. PATENT DOCUMENTS

| | | | | |
|---|---|---|---|---|
| 2012/0162407 | A1* | 6/2012 | Katoh | H04N 7/183 348/118 |
| 2014/0009617 | A1* | 1/2014 | Utagawa | G08G 1/167 348/148 |
| 2014/0010408 | A1* | 1/2014 | Irie | G06T 7/0002 382/103 |
| 2015/0172582 | A1* | 6/2015 | Kiyohara | H04N 5/2171 348/322 |
| 2015/0202663 | A1 | 7/2015 | Oba et al. | |
| 2015/0203076 | A1* | 7/2015 | Irie | B60S 1/481 134/56 R |
| 2015/0329083 | A1* | 11/2015 | Kiyohara | B60S 1/0848 348/148 |
| 2016/0284076 | A1* | 9/2016 | Voros | H04N 17/002 |
| 2016/0307054 | A1* | 10/2016 | Takemura | H04N 5/2171 |
| 2016/0364620 | A1* | 12/2016 | Akiyama | G06K 9/00791 |
| 2017/0140227 | A1 | 5/2017 | Takemura et al. | |
| 2018/0086309 | A1* | 3/2018 | Kono | G01N 21/958 |
| 2018/0114089 | A1* | 4/2018 | Ikeda | B60R 1/00 |
| 2019/0041849 | A1* | 2/2019 | Kida | G05D 1/0055 |
| 2020/0084356 | A1* | 3/2020 | Tsurube | H04N 5/22521 |
| 2020/0108425 | A1* | 4/2020 | Oba | B08B 5/00 |
| 2020/0391702 | A1* | 12/2020 | Yamauchi | B60S 1/56 |

FOREIGN PATENT DOCUMENTS

| | | |
|---|---|---|
| JP | 2014026049 A | 2/2014 |
| JP | 2014030188 A | 2/2014 |
| WO | 2016017340 A1 | 2/2016 |

OTHER PUBLICATIONS

Extended European Search Report from EP Application No. 18840762.1 dated Apr. 8, 2021, 14 pages.

* cited by examiner

ADHERED-SUBSTANCE DETECTING APPARATUS AND VEHICLE SYSTEM EQUIPPED WITH THE SAME

TECHNICAL FIELD

The present invention relates to an adhered-substance detecting apparatus and a vehicle system equipped with the same and, for example, to an adhered-substance detecting apparatus for detecting adhered substances on a lens or the like for a camera installed at a moving body such as a vehicle and a vehicle system equipped with the adhered-substance detecting apparatus.

BACKGROUND ART

There is a vehicle system equipped with a function detecting objects and signs around a vehicle by using captured images photographed by a camera installed in the vehicle (hereinafter sometimes referred to as the in-vehicle camera) (hereinafter referred to as the ambient sensing). For example, it is a vehicle system that detects other vehicles and pedestrians (hereinafter sometimes collectively referred to as the "obstacles") existing behind the vehicle from captured images photographed by an in-vehicle camera installed at a rear face of the vehicle and reminds a driver of caution via sound or indicator light.

If the adhered substance(s) such as water droplets, mud, and dust (hereinafter sometimes referred to as the adhered substance on a lens) adheres to a lens for the in-vehicle camera, that adhered substance on the lens appears in a captured image photographed by the in-vehicle camera and hides the scenery behind the adhered substance on the lens. As a result, the vehicle system described above will not be able to detect any obstacle(s) hiding behind the adhered substance on the lens.

So, methods for detecting the adhered substance(s) on the lens from the captured image(s) have been devised. For example, PTL 1 discloses a vehicle system that: detects an image area which does not have any change with time while a vehicle is running, as an area in which the adhered substance on the lens appears; and stops the ambient sensing using an in-vehicle camera if the size of the detected area exceeds a threshold value. This method is a method for detecting the adhered substance on the lens by utilizing the fact that while the vehicle is running, the scenery flows by, but the adhered substance on the lens continues to appear, without any change, in the area where the adhered substance on the lens appears.

However, an image area where a uniform scenery (such as a road surface, guard rails, and sidewalks) appears in a traveling direction of the vehicle does not pass by (or change) along with movements of the vehicle and thereby does not change with time. Therefore, regarding the method described in PTL 1 detecting the adhered substance on the lens, there is a possibility that such scenery might also be mistakenly detected as the adhered substance on the lens.

As a method for enhancing the precision to detect the adhered substance on the lens regarding the above-described problem, PTL 2 discloses a method of using edge features and brightness. This method is to: divide a captured image photographed by an in-vehicle camera into a plurality of areas (blocks) and then firstly extract a block(s) with edge intensity within a certain range (weak edges); and subsequently extract blocks surrounded by many bright blocks (i.e., further next to blocks adjacent to the above-extracted block). Through this processing, a blurred outline of the adhered substance on the lens is extracted as weak edges and an area of the adhered substance on the lens, which blocks natural light and becomes dark, is further detected.

CITATION LIST

Patent Literature

PTL 1: Japanese Patent Application Laid-Open (Kokai) Publication No. 2012-38048
PTL 2: Japanese Patent Application Laid-Open (Kokai) Publication No. 2014-30188

SUMMARY OF THE INVENTION

Problems to be Solved by the Invention

However, the method described in PTL 2 for detecting the adhered substance on the lens detects the blurred outline (weak edges) of the adhered substance on the lens, but does not detect an area inside the outline. As the adhered substance on the lens is larger, a proportion of the inside area to the outline becomes larger; and, therefore, detection performance of the method described in PTL 2 for detecting the adhered substance on the lens degrades with regard to a large substance(s) adhering to the lens. As a result, if any large substance adheres to the lens, there is a possibility that the ambient sensing by using an image(s) captured by the in-vehicle camera might not be stopped.

Furthermore, if the adhered substance on the lens is water droplets with no thickness, their outlines are ambiguous and it is difficult to detect the outlines. On the other hand, if the ambiguous outlines of the water droplets are set as targets to be detected, the scenery which is irrelevant to the adhered substance on the lens might be also detected as the adhered substance on the lens.

The present invention was devised in light of the above-described circumstances and it is an object of the invention to provide an adhered-substance detecting apparatus capable of detecting an adhered substance(s) such as water droplets, mud, and dust which adhere to, for example, a lens for an in-vehicle camera, including those with ambiguous outlines, and a vehicle system equipped with the above-described adhered-substance detecting apparatus.

Means to Solve the Problems

In order to solve the above-described problems, an adhered-substance detecting apparatus according to the present invention is an adhered-substance detecting apparatus for detecting an adhered substance appearing in a captured image photographed by an imaging apparatus installed at a moving body, wherein the adhered-substance detecting apparatus includes: an outline extraction unit that extracts an area of an outline of the adhered substance from the captured image as an outline area; an inside extraction unit that extracts an area inside the outline of the adhered substance from the captured image as an inside area; an adhered-substance-detected area judgment unit that compares the outline area with the outline of the adhered substance and detects the outline area with either one of matching shape and matching luminance as an adhered substance outline area, compares the inside area with the area inside the outline of the adhered substance and detects the inside area with either one of matching shape and matching luminance as an adhered substance inside area, and detects an area of the adhered substance, which is composed of either one of the outline of the adhered substance and the area inside the outline of the adhered substance, as an adhered-substance-detected area from either one of the adhered substance outline area and the adhered substance inside area.

Furthermore, a vehicle system according to the present invention includes: the above-described adhered-substance detecting apparatus; the above-described imaging apparatus that is mounted in a vehicle and captures images of surroundings of the vehicle; and an ambient sensing unit that changes operation on the basis of the adhered-substance-detected area detected by the adhered-substance-detected area judgment unit and detects an object and/or a sign regarding a captured image photographed by the imaging apparatus.

Advantageous Effects of the Invention

The adhered substance(s) such as water droplets, mud, and dust which adhere to, for example, the lens for the imaging apparatus and which appears in a captured image(s) photographed by the imaging apparatus, including those with ambiguous outlines, can be detected with high precision according to the present invention.

Furthermore, the area of the adhered substance in the captured image by the imaging apparatus can be detected, so that if the adhered-substance-detected area is overlaid on the captured image and then displayed on, for example, a display inside the vehicle, it can be clearly indicated to the driver that the vehicle system recognizes the adhered substance.

Furthermore, regarding ambient sensing that uses the captured image(s), if the area of the adhered substance in the captured image by the imaging apparatus is masked, any defects of the ambient sensing attributable to the adhered substance(s) can be suppressed.

Problems, configurations, and advantageous effects other than those described above will become apparent from the description of embodiments below.

DESCRIPTION OF EMBODIMENTS

An adhered-substance detecting apparatus and a vehicle system equipped with the adhered-substance detecting apparatus according to the present invention will be explained below with reference to the drawings.

Embodiment 1

[Apparatus Configuration of Vehicle System]

Figure 1:
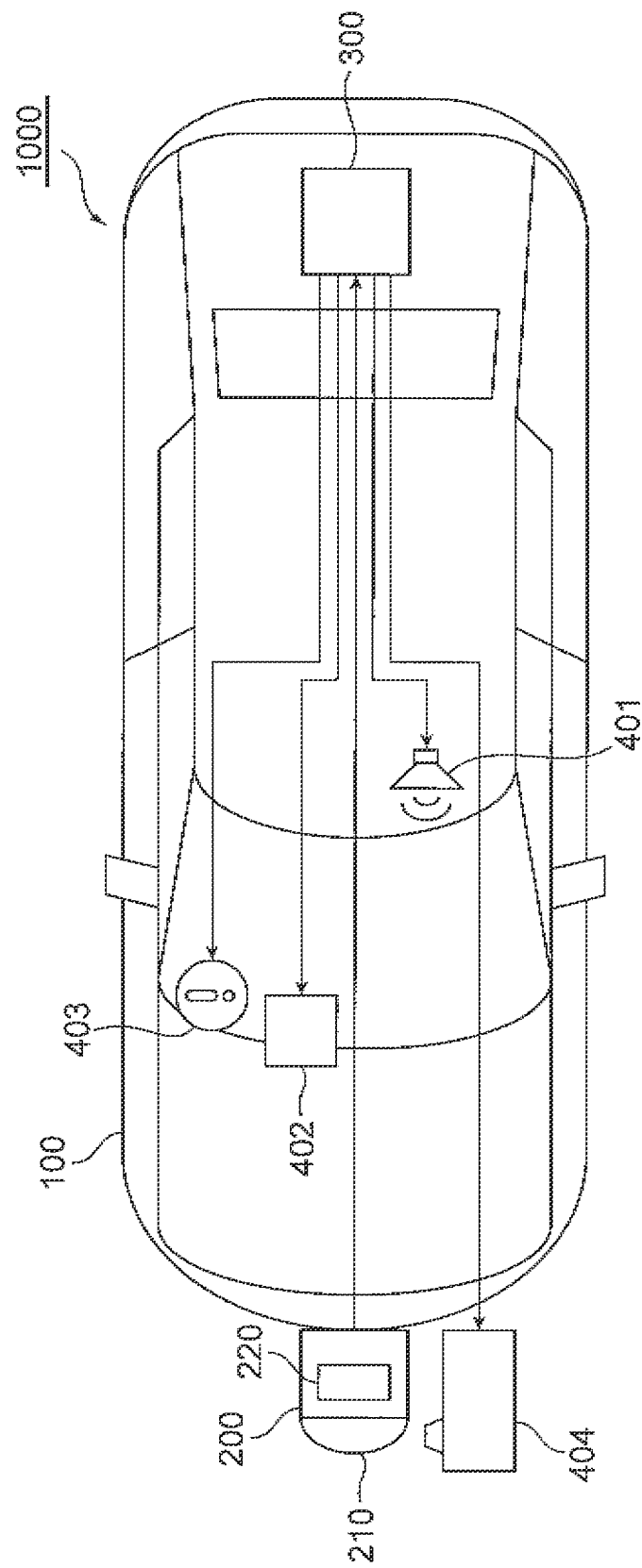
FIG. 1 is a schematic diagram illustrating a vehicle in which a vehicle system equipped with an adhered-substance detecting apparatus according to Embodiment 1 is mounted.
Figure 2:
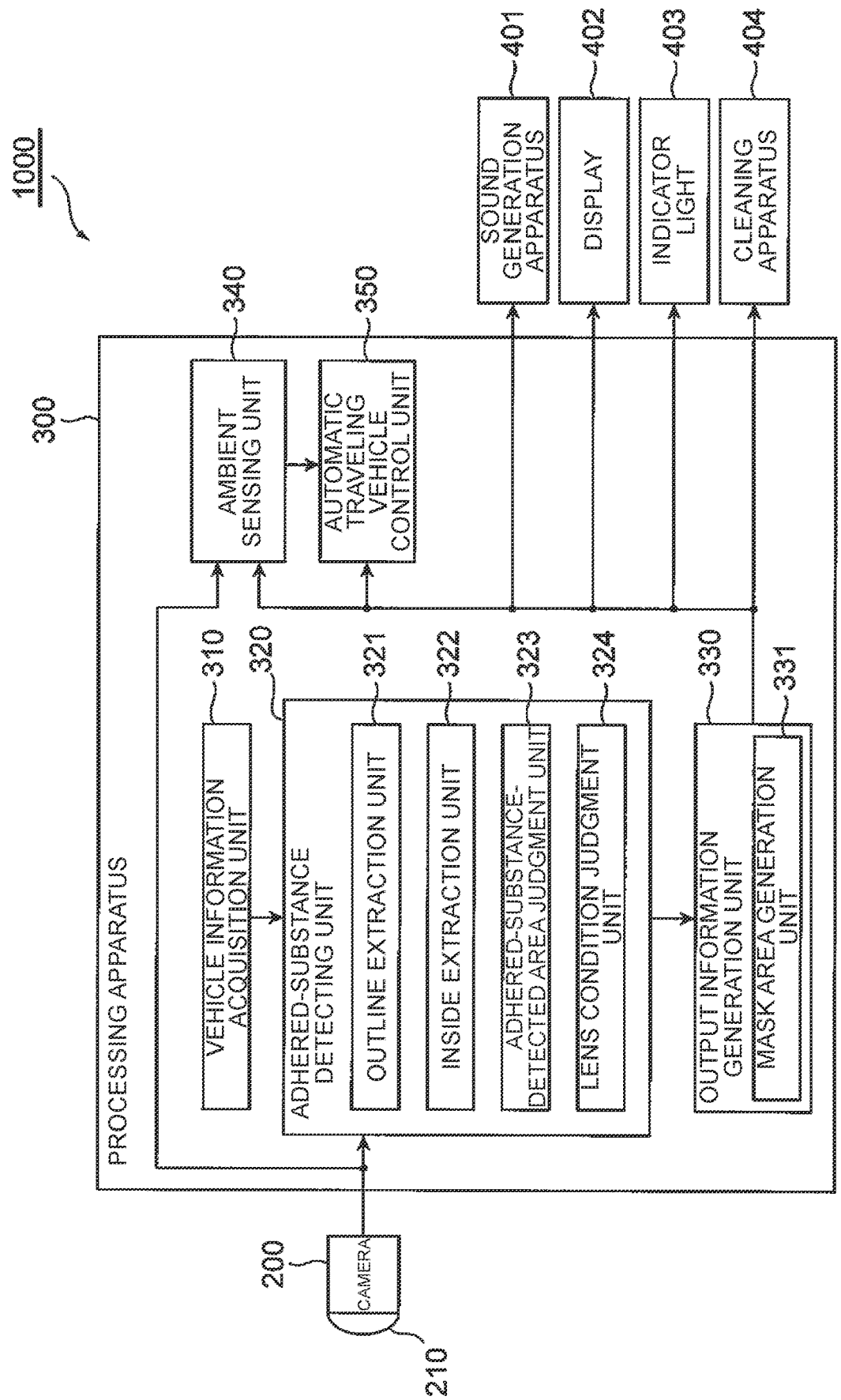
FIG. 2 is a block diagram illustrating the configuration of the vehicle system equipped with the adhered-substance detecting apparatus according to Embodiment 1.

FIG. 1 is a diagram of a vehicle 100 in which a vehicle system 1000 equipped with an adhered-substance detecting apparatus according to Embodiment 1 is mounted, as viewed from above. Furthermore, FIG. 2 is a block diagram illustrating the configuration of the vehicle system 1000 illustrated in FIG. 1.

With the vehicle system 1000 according to the embodiment illustrated in the drawing, a camera 200 as an imaging apparatus is installed at a front face of a vehicle body of the vehicle 100. This camera 200: is configured by including a lens 20 for forming images of scenery in front of the vehicle body and an image sensor 220 for converting the formed images into an electrical signal; and outputs the scenery in front of the camera 200 as a captured image(s). The captured image(s) photographed by the camera 200 is transferred via cables or the like to a processing apparatus 300 mounted in the vehicle 100 and then processed.

The processing apparatus 300 includes an adhered-substance detecting unit (adhered-substance detecting apparatus) 320 that executes a function detecting the adhered substance on the lens such as water droplets, mud, and dust adhering to a lens 210 for the camera 200 from the captured image by the camera 200 (hereinafter referred to as the "adhered substance detection").

Moreover, the processing apparatus 300 includes an ambient sensing unit 340 that executes an application for detecting obstacles, signs, and so on in front of the vehicle 100 from the captured image(s) by the camera 200 (hereinafter referred to as the "ambient sensing"). Various known applications can be used for this purpose. For example, applications or the like for detecting parking frame lines in a parking facility and for detecting pedestrians crossing a road in front of the vehicle 100 are known. However, the ambient sensing unit 340 is not an indispensable constituent element for this embodiment and the vehicle system 1000 which does not include the ambient sensing unit 340 may also be used.

Furthermore, the processing apparatus 300 includes an automatic traveling vehicle control unit 350 that makes the vehicle 100 run automatically based on the detection result of the ambient sensing unit 340. For example, in a scene to park the vehicle 100, the automatic traveling vehicle control unit 350 makes the vehicle 100 run towards any one of parking frames detected around the vehicle 100. Also, if any obstacle is detected in a traveling direction of the vehicle 100, the automatic traveling vehicle control unit 350 makes the vehicle 100 stop. However, the automatic traveling vehicle control unit 350 is not an indispensable constituent element for this embodiment and the vehicle system 1000 which does not include the automatic traveling vehicle control unit 350 may also be used.

Furthermore, the processing apparatus 300: is connected to a sound generation apparatus 401, a display 402, an indicator light 403, and a cleaning apparatus 404 mounted at the camera 200, which are installed inside the vehicle 100 (in the vehicle interior), so that they can communicate with each other; and operates them based on information about the adhered substance on the lens, which is detected by the adhered-substance detecting unit 320. For example, if the lens 210 is severely dirty with the adhered substance on the lens, an instruction is issued to a passenger of the vehicle 100 to clean the lens 210 by using the sound generation apparatus 401, the display 402, and the indicator light 403. Also, the cleaning apparatus 404 is operated to automatically clean the lens 210. Various known methods can be used for the cleaning apparatus 404. For example, there are a method of using a wiper device attached to the camera 200 to wipe off the adhered substance which adheres to the surface of the lens 210, and a method of ejecting water or wind to the lens 210 to remove the adhered substance on the lens 210. However, in this embodiment, the sound generation apparatus 401, the display 402, the indicator light 403, and the cleaning apparatus 404 are not indispensable constituent elements and any one of them may be missing or all of them may not be included. Furthermore, they may be of other forms. For example, a seat belt for the driver's seat may be caused to vibrate instead of the sound generation apparatus 401.

Incidentally, in this embodiment, the camera 200 is installed on a front face of the vehicle body of the vehicle 100 and captures images of an area in front of the vehicle 100; however, this embodiment is not limited to this example. For example, the camera 200 may be a camera which is installed on a rear face of the vehicle body and captures images of an area behind the vehicle 100, or a camera(s) which is installed on a side face(s) of the vehicle body and captures images of, for example, an area(s) on the lateral side(s) of the vehicle 100 or an area obliquely in front of the vehicle 100, or a camera which is installed in the vehicle interior and captures images of an area outside the vehicle 100. Moreover, there may be one camera 200 or a plurality of cameras 200.

Furthermore, in this embodiment, the adhered substance which adheres to the lens 210 for the camera 200 is detected by the adhered substance detection executed by (the adhered-substance detecting unit 320 for) the processing apparatus 300; however, this embodiment does not limit the place to which the adhered substance adheres, to the lens 210. The adhered substance which adheres to a transparent surface which is located in front of the image sensor 220 for the camera 200 and is fixed on the vehicle 100 or the camera 200 is set as a detection target. For example, if the camera 200 is installed in the vehicle interior of the vehicle 100, an adhered substance(s) which adheres to not only the lens 210 for the camera 200, but also a windshield of the vehicle 100 in front of the camera 200 and appears in a captured image(s) by the camera 200 is also set as the detection target.

Furthermore, in this embodiment, the processing apparatus 300 is separated from, and connected via a cable or the like to, the camera 200; however, this embodiment is not limited to this example. For example, the processing apparatus 300 and the camera 200 may be connected together via wireless communication. Moreover, the processing apparatus 300 may be built in the camera 200.

Furthermore, in this embodiment, the processing apparatus 300 is mounted in the vehicle 100; however, it may be installed outside the vehicle 100. In this case, the processing apparatus 300 is connected by a network to the camera 200, the sound generation apparatus 401, the display 402, the indicator light 403, and the cleaning apparatus 404 which are mounted in the vehicle 100, via wireless communication.

Furthermore, in this embodiment, a passenger in the vehicle interior of the vehicle 100 is notified of information about the adhered substance on the lens 210; however, this embodiment is not limited to this example. The sound generation apparatus 401, the display 402, and the indicator light 403 may be installed outside the vehicle 100 and send notification to outside the vehicle 100. This can be realized by, for example, connecting a mobile terminal equipped with the functions of the sound generation apparatus 401, the display 402, and the indicator light 403 to the processing apparatus 300 via a wireless communication network.

[Functional Configuration of Vehicle System]

The configuration and functions of the vehicle system 1000 according to Embodiment 1 will be explained in more detail with reference to FIG. 2.

The vehicle system 1000 according to this embodiment 1 is mounted in the vehicle 100 as described above and includes, as illustrated in FIG. 2: the camera 200; the processing apparatus 300 equipped with the vehicle information acquisition unit 310, the adhered-substance detecting unit 320, the output information generation unit 330, the ambient sensing unit 340, and the automatic traveling vehicle control unit 350; the sound generation apparatus 401; the display 402; the indicator light 403; and the cleaning apparatus 404.

The camera 200 generates captured images by photographing the area in front of the vehicle 100. However, this embodiment is not limited to this example. The captured images may be generated by photographing the area behind the vehicle 100 or the area on the lateral side of the vehicle 100 as described earlier.

The ambient sensing unit 340 for the processing apparatus 300 detects objects, signs, and so on in front of the vehicle 100 from the captured images by the camera 200. Incidentally, the vehicle system 1000 may also use an external recognition device such as a sonar other than the camera 200 to detect the objects, signs, and so on in front of the vehicle 100.

The automatic traveling vehicle control unit 350 makes the vehicle 100 run automatically by controlling various types of actuators (such as an engine, an accelerator, a brake, shifts, and a steering gear) of the vehicle 100 on the basis of the detection results of the ambient sensing unit 340.

The vehicle information acquisition unit 310 acquires vehicle information (such as a vehicle speed) from the vehicle system 1000 which integrates the vehicle information measured by sensors provided in the vehicle 100. However, this embodiment is not limited to this example. The vehicle information may be acquired directly from the above-mentioned sensors. Also, if the vehicle information is not used for the processing by the adhered-substance detecting unit 320, this processing unit can also be omitted.

The adhered-substance detecting unit 320 is configured of the outline extraction unit 321, the inside extraction unit 322, the adhered-substance-detected area judgment unit 323, and the lens condition judgment unit 324 and processes the captured image by the camera 200 on the basis of the vehicle information (such as the vehicle speed) acquired by the vehicle information acquisition unit 310. Under this circumstance, the outline extraction unit 321 extracts an area having a feature of the outline of the adhered substance on the lens (outline area) from the captured image by the camera 200. The inside extraction unit 322 extracts an area having a feature of the inside area (of the outline) of the adhered substance on the lens (inside area) from the captured image by the camera 200. The adhered-substance-detected area judgment unit 323 detects an area in which the adhered substance on the lens appears in the image (adhered-substance-detected area) on the basis of the outline area and the inside area. The lens condition judgment unit 324 judges the dirtiness of the lens 210 for the camera on the basis of the adhered-substance-detected area. Incidentally, the adhered substance detection processing by this adhered-substance detecting unit 320 will be explained later in detail.

The output information generation unit 330: generates information based on the adhered-substance-detected area detected by the adhered-substance-detected area judgment unit 323 or the lens condition judged by the lens condition judgment unit 324; and outputs the information to the ambient sensing unit 340, the automatic traveling vehicle control unit 350, the sound generation apparatus 401, the display 402, the indicator light 403, and the cleaning apparatus 404, respectively.

{Processing of Output Information Generation Unit 330}

The processing of the output information generation unit 330 will be explained in more detail.

The output information generation unit 330 generates signals based on the adhered-substance-detected area and the dirtiness of the lens 210 detected by the adhered-substance detecting unit 320 and outputs the signals to the ambient sensing unit 340, the automatic traveling vehicle control unit 350, the sound generation apparatus 401, the display 402, the indicator light 403, and the cleaning apparatus 404, respectively.

For example, if the dirtiness of the lens 210 is severe, a signal to stop the ambient sensing is input to the ambient sensing unit 340 and a command to stop the vehicle 100 is input to the automatic traveling vehicle control unit 350. Moreover, the passenger(s) of the vehicle 100 is notified that the lens 210 is severely dirty, the ambient sensing by the ambient sensing unit 340 is to be stopped, and the vehicle 100 is to be stopped, by means of, for example, sounds emitted from the sound generation apparatus 401, letters and icons displayed on the display 402, and colors of the indicator light 403. Furthermore, a command to clean the lens 210 is input to the cleaning apparatus 404.

Incidentally, the operation of the output information generation unit 330 according to this embodiment is not limited to the above-described content.

Figure 8:
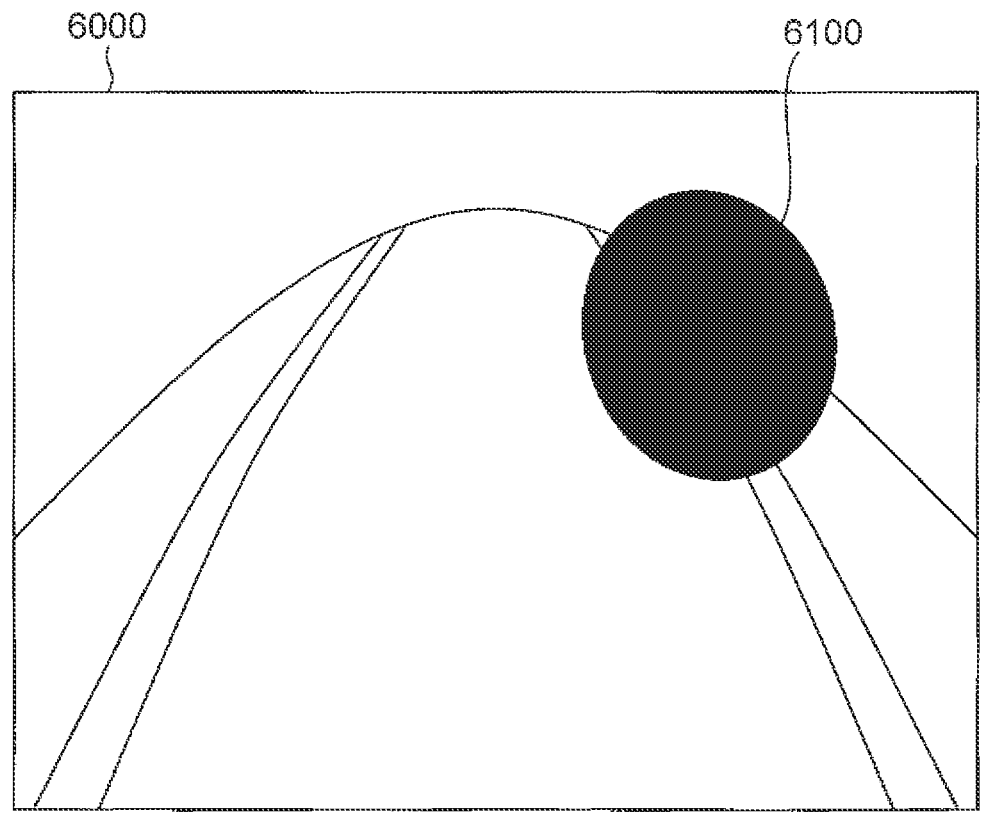
FIG. 8 is an example of a captured image photographed by a camera with an adhered substance on a lens.
Figure 9:
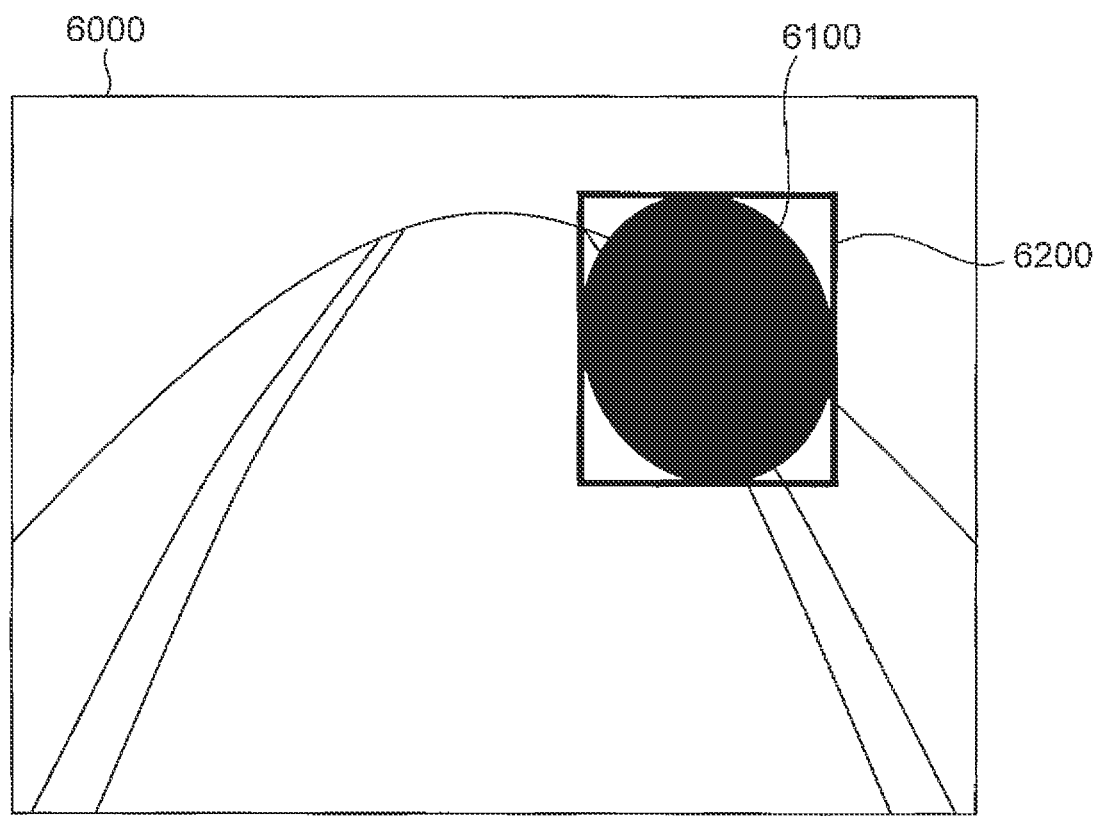
FIG. 9 is an example of the captured image in which an adhered-substance-detected area is highlighted.
Figure 10:
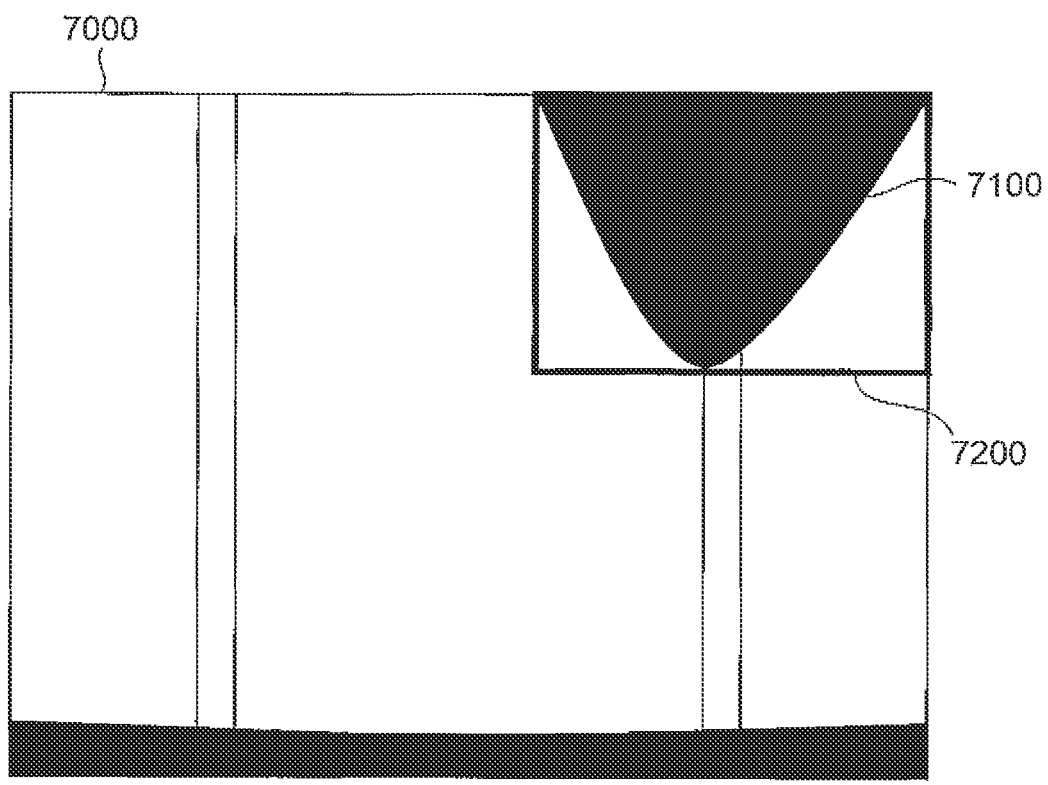
FIG. 10 is an example of a bird's-eye view image in which the adhered-substance-detected area is highlighted.

For example, when a captured image 6000 as illustrated in FIG. 8 by the camera 200 is displayed on the display 402, a frame 6200 to surround and highlight an adhered-substance-detected area 6100 detected by the adhered-substance detecting unit 320 may be displayed as illustrated in FIG. 9. Moreover, when coordinate transformation of the captured image by the camera 200 is executed and an image of the vehicle 100 and its surroundings as viewed from above the sky (a bird's-eye view image) 7000 is displayed on the display 402, a frame 7200 to surround the adhered-substance-detected area 7100 on the bird's-eye view image 7000 may be overlaid and displayed over the bird's-eye view image 7000 as illustrated in FIG. 10. Through such processing, it can be indicated to the passenger(s) of the vehicle 100 that the vehicle system 1000 recognizes the adhered substance on the lens 210. Incidentally, in order to avoid momentarily highlighting an area which is mistakenly detected as the adhered substance, the adhered-substance-detected area which has been continuously detected for a certain period of time or longer may be highlighted.

Figure 11:
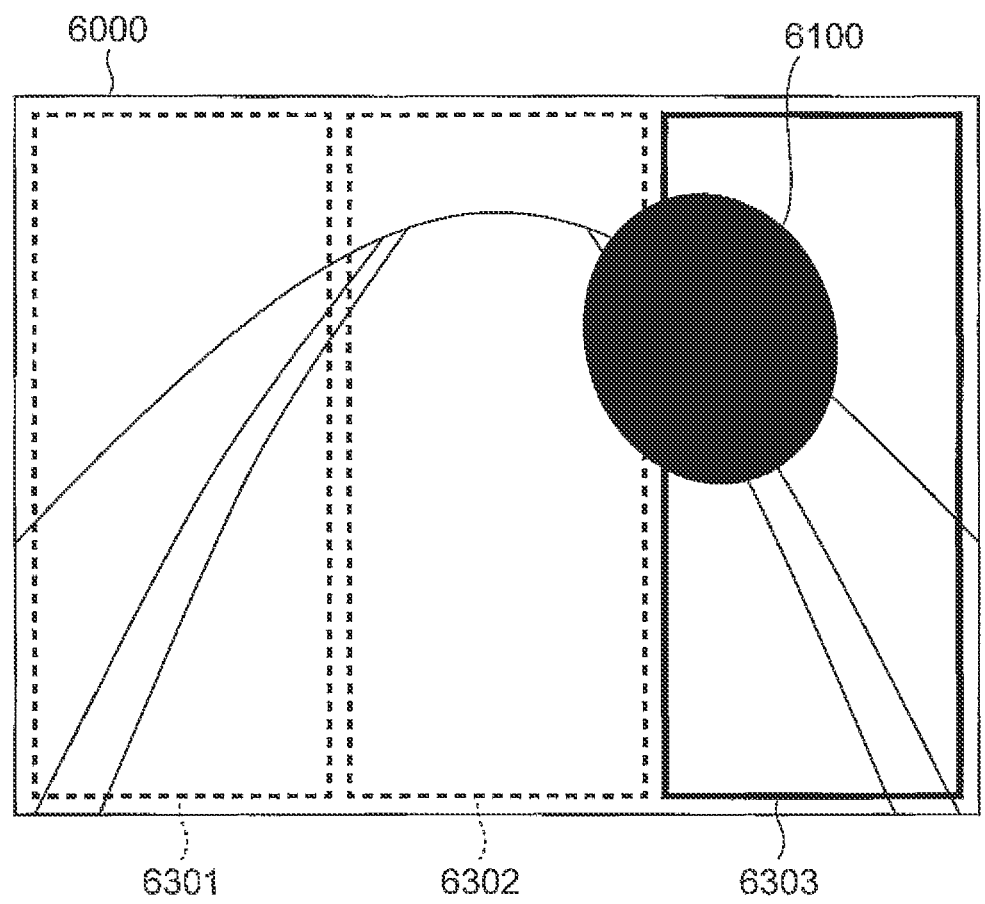
FIG. 11 is an example of the captured image in which an area with many adhered-substance-detected areas is highlighted.

Furthermore, as illustrated in FIG. 11, the captured image 6000 by the camera 200 may be divided into a plurality of areas (divided areas); the planar dimension of the adhered-substance-detected area 6100 may be judged for each divided area; and the divided area regarding which the planar dimension of the adhered-substance-detected area 6100 is equal to or more than a threshold value may be highlighted and displayed on the display 402. In the example illustrated in FIG. 11, the captured image 6000 by the camera 200 is divided in a crosswise direction into three divided areas 6301, 6302, 6303 and the divided area in which the planar dimension of the adhered-substance-detected area 6100 is large (the divided area on the right side in FIG. 11) 6303 is highlighted with a solid line. Incidentally, when the processing apparatus 300 includes a plurality of different adhered-substance detecting units 320 depending on the types of the adhered substance(s) on the lens, the divided areas may be changed according to the type of the adhered substance on the lens or a threshold value used for the judgment of the planar dimension of the adhered-substance-detected area 6100 (judgment threshold value) may be changed.

Figure 12:
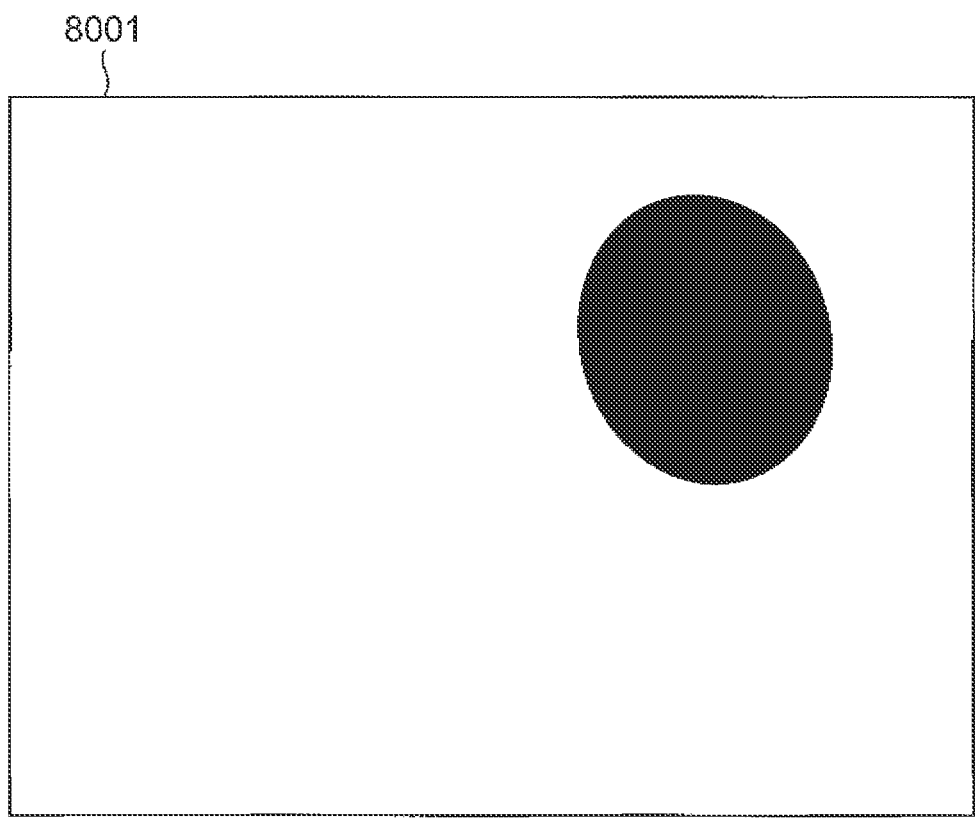
FIG. 12 is an example of a mask image where the adhered-substance-detected area is masked.
Figure 13:
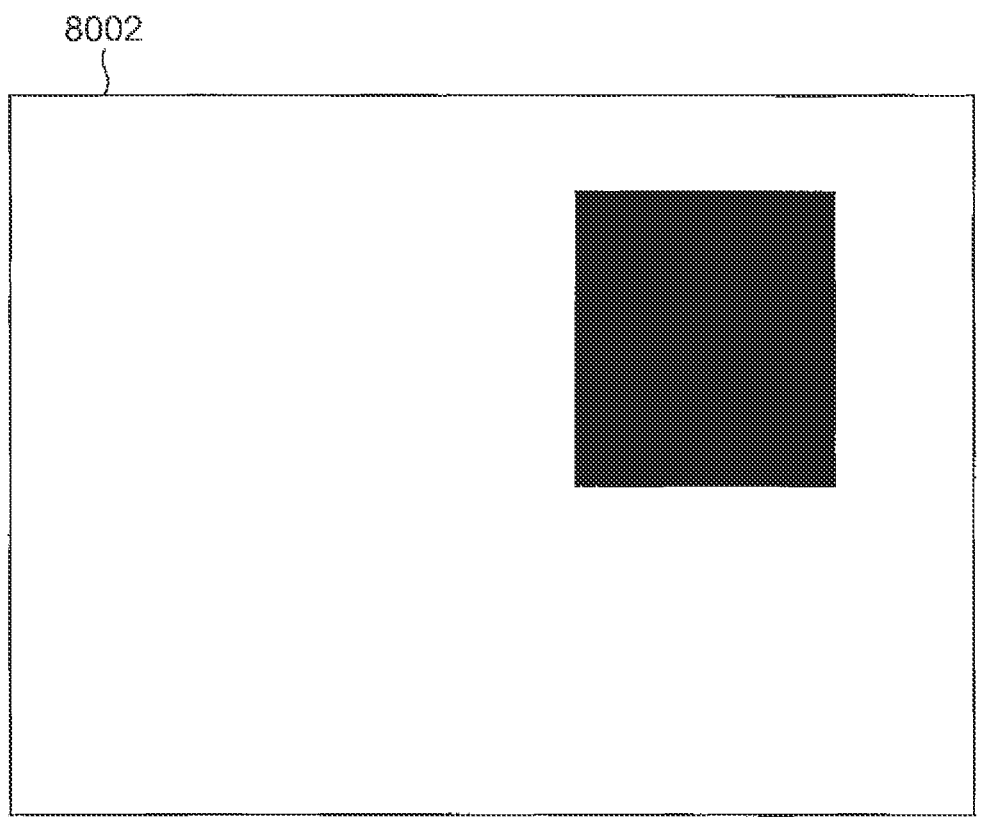
FIG. 13 is an example of a mask image in which the inside of a frame surrounding the adhered-substance-detected area is masked.
Figure 14:
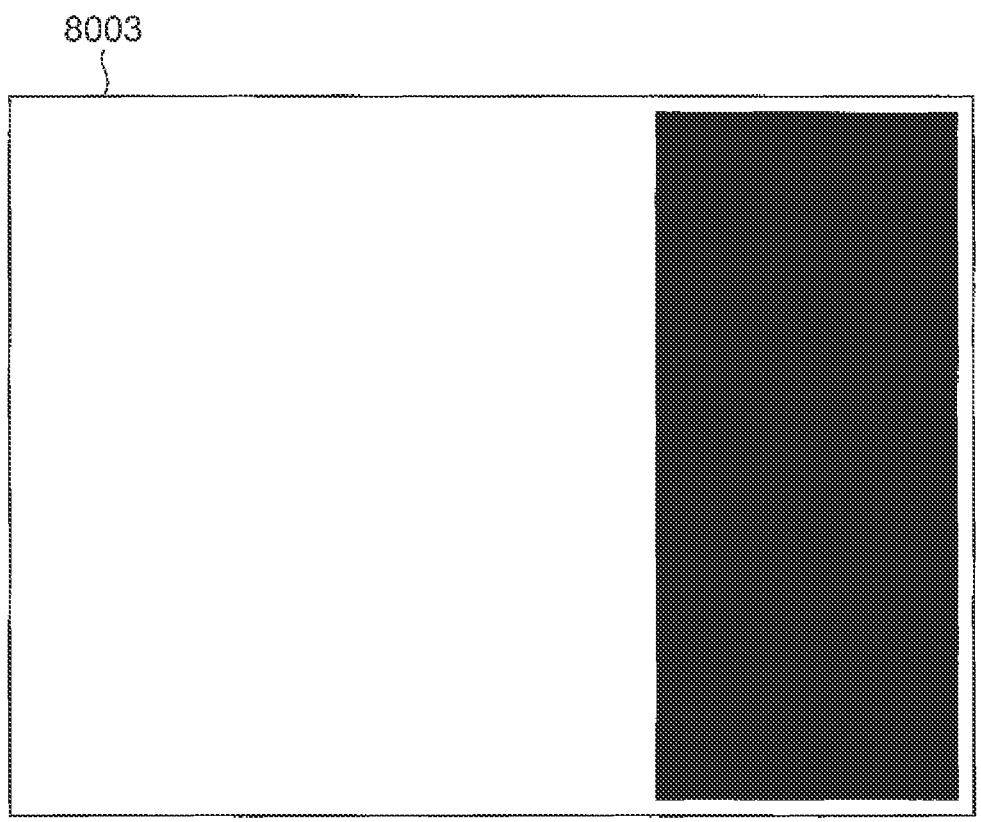
FIG. 14 is an example of a mask image in which a divided area with many adhered-substance-detected areas is masked.

Furthermore, the output information generation unit 330 may include a mask area generation unit 331 that generates a mask image, which excludes an area to be not used by the ambient sensing unit 340, on the basis of the adhered-substance-detected area detected by the adhered-substance-detected area judgment unit 323 for the adhered-substance detecting unit 320. For example, the mask area generation unit 331 generates a mask image 8001 as illustrated in FIG. 12 for directly masking the adhered-substance-detected area 6100 in the captured image 6000 in FIG. 8. Incidentally, in order to avoid momentarily masking an area which is mistakenly detected as the adhered substance, the mask image may be generated so as to mask the adhered-substance-detected area which has been continuously detected for a certain period of time or longer. Furthermore, the mask image generated by the mask area generation unit 331 according to this embodiment is not limited to this example. Besides the above-described example, a mask image 8002 as illustrated in FIG. 13 to mask the area inside the frame 6200 which surrounds the adhered-substance-detected area 6100 as illustrated in FIG. 9 may be generated, or a mask image 8003 as illustrated in FIG. 14 to mask the entire divided area 6303 with many adhered-substance-detected areas 6100 as illustrated in FIG. 11 may be generated. Incidentally, the range of the divided area 6303 or the judgment threshold value may be changed according to the ambient sensing ability of the ambient sensing unit 340. For example, regarding the ambient sensing that normally functions even if an area of less than 20 pixels is defective, the planar dimension of the divided area or the judgment threshold value may possibly be set as equal to or more than 20 pixels.

The mask image generated by the mask area generation unit 331 is transferred to the ambient sensing unit 340 and the automatic traveling vehicle control unit 350. The ambient sensing unit 340 excludes the area with the adhered substance on the lens from the captured image by the camera 200 by using this mask image and is used for the ambient sensing. Consequently, the ambient sensing can be performed without being affected by the adhered substance on the lens. However, objects, signs, and so on which exist in the area masked with the mask image are not detected, so that the ambient sensing unit 340 may output the area masked with the mask image as an unknown area. Furthermore, the automatic traveling vehicle control unit 350 recognizes the area excluded by the mask image as the unknown area for the ambient sensing unit 340 using the captured image by the camera 200 and controls the vehicle by assuming that there are obstacles and moving bodies there. For example, the automatic traveling vehicle control unit 350 controls the vehicle to prevent the vehicle 100 from advancing to the unknown area.

{Adhered Substance Detection Processing by Adhered-Substance Detecting Unit 320}

The adhered substance detection processing by the adhered-substance detecting unit (adhered-substance detecting apparatus) 320 according to Embodiment 1 will be explained below in detail with reference to the flowcharts in FIG. 3 to FIG. 7.

Figure 3:
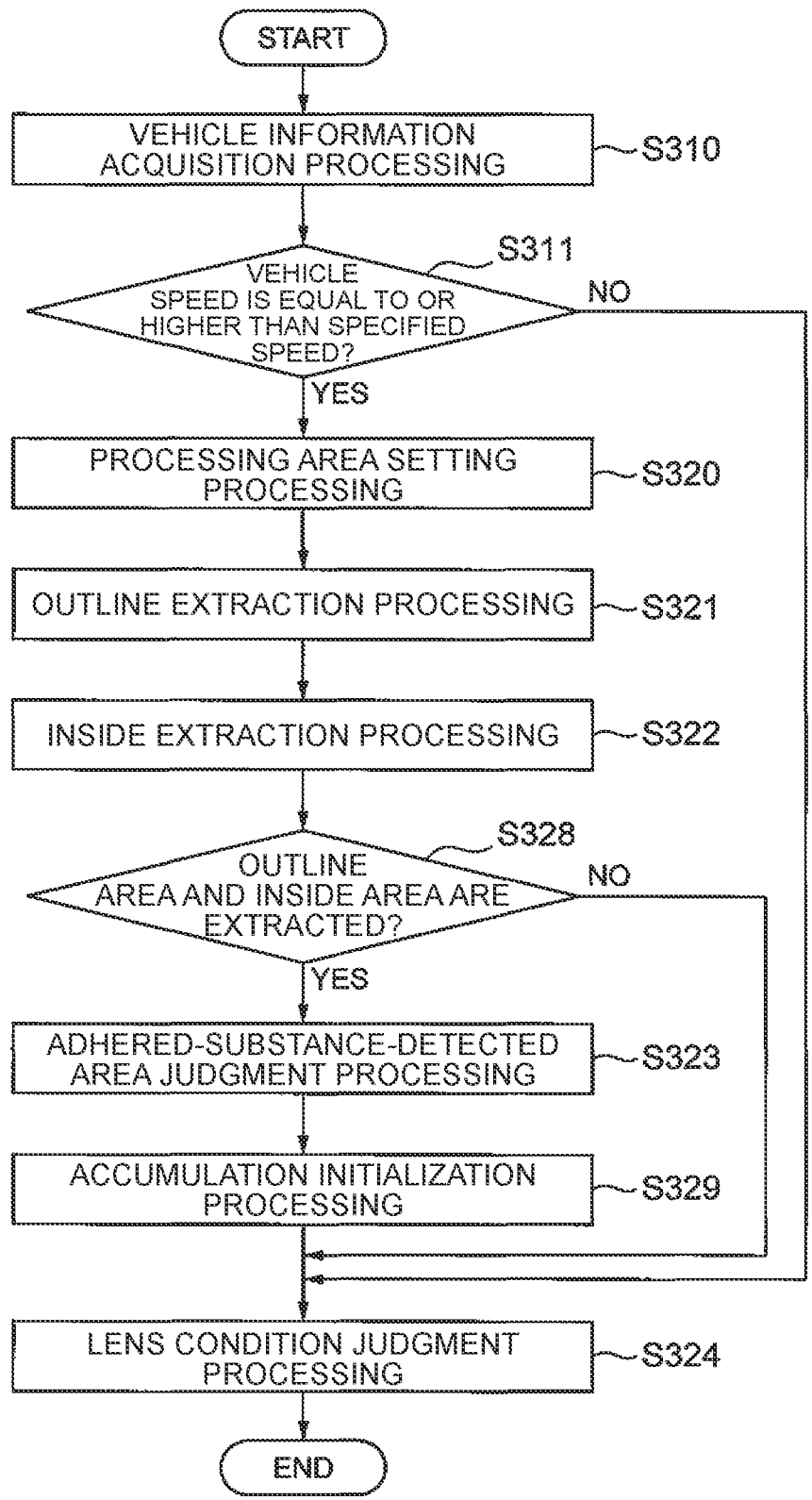
FIG. 3 is an overview flowchart illustrating a flow of adhered substance detection processing by the adhered-substance detecting apparatus according to Embodiment 1.
Figure 4:
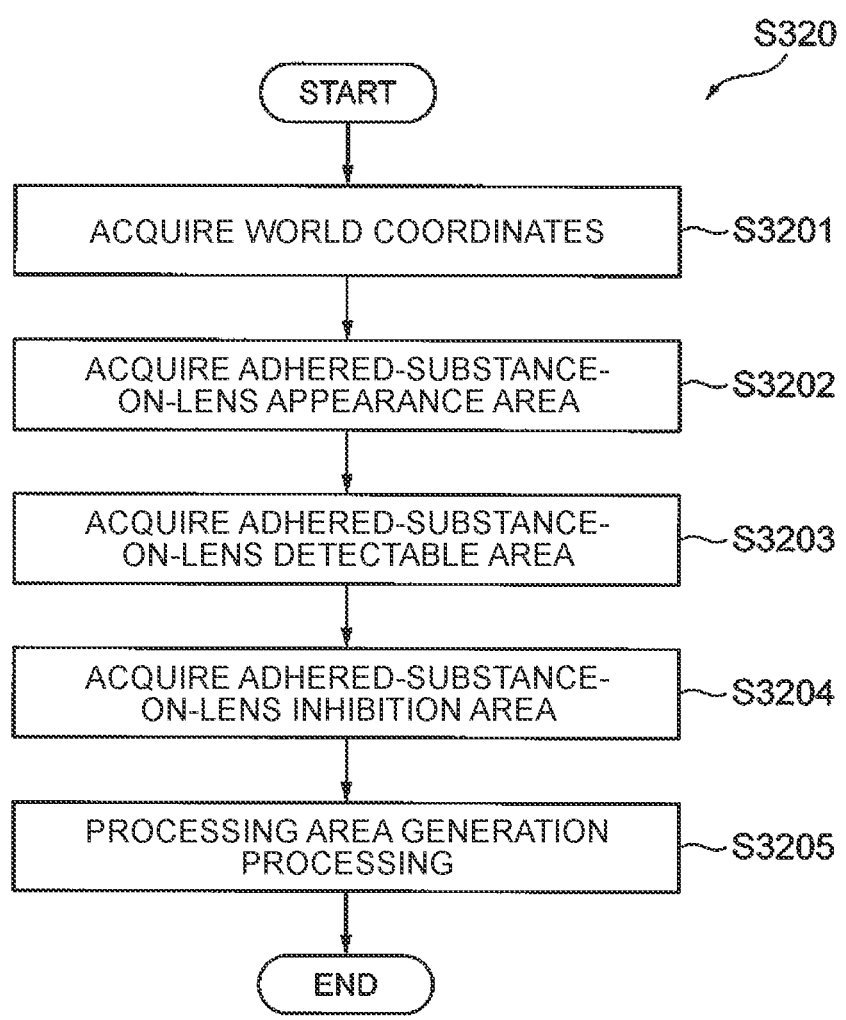
FIG. 4 is an overview flowchart illustrating a flow of processing area setting processing.
Figure 5:
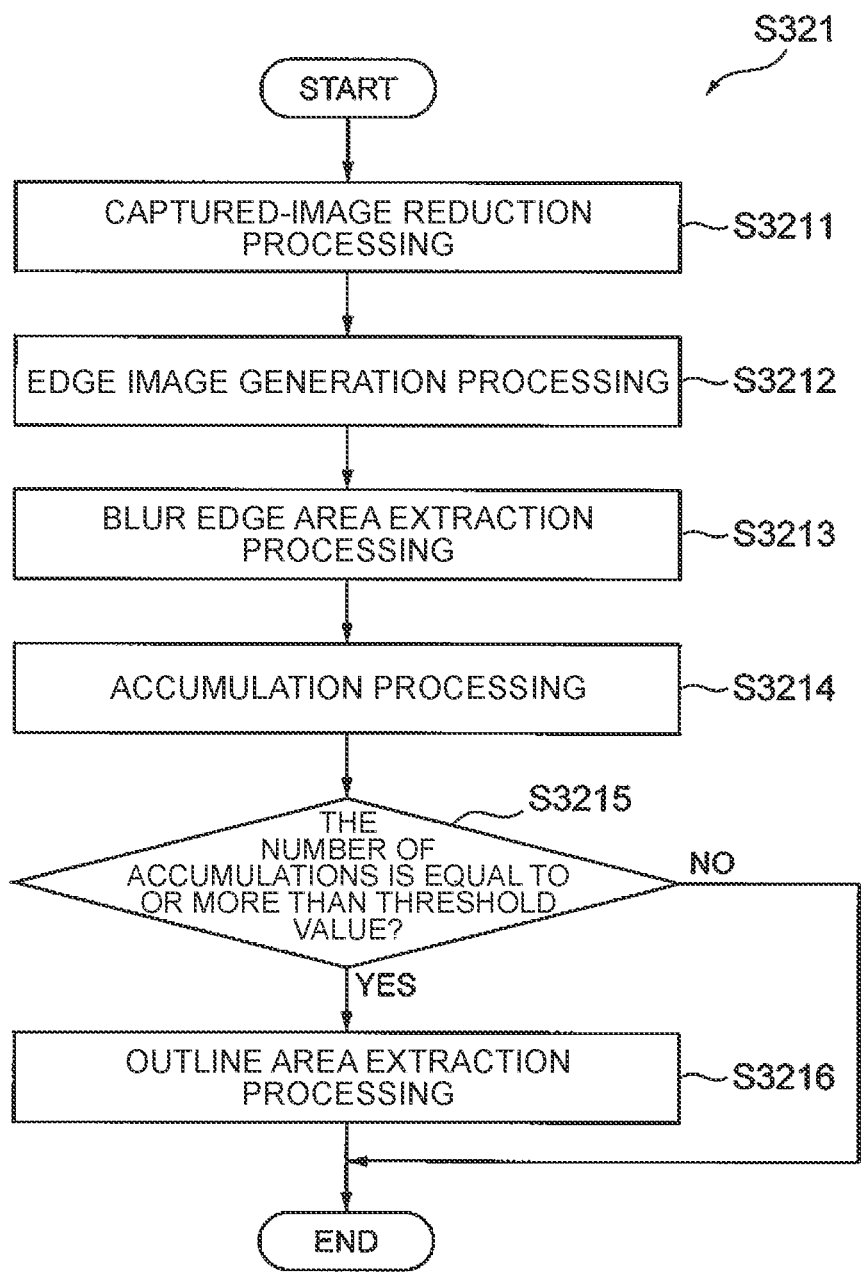
FIG. 5 is an overview flowchart illustrating a flow of outline extraction processing.
Figure 6:
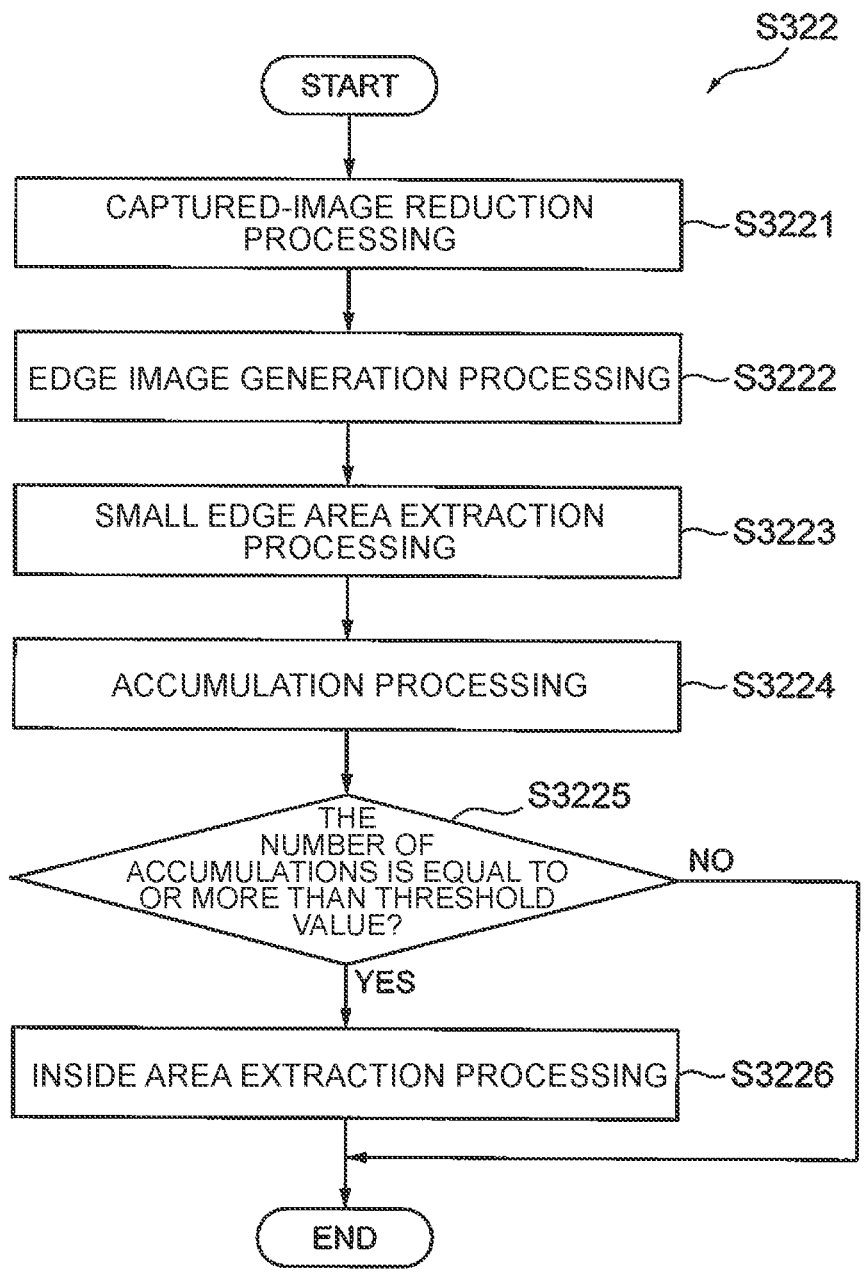
FIG. 6 is an overview flowchart illustrating a flow of inside extraction processing.

Referring to the flowchart in FIG. 3, the adhered substance detection processing by the adhered-substance detecting unit 320 according to Embodiment 1 is mainly composed of: vehicle information acquisition processing (step S310) and vehicle speed judgment processing (step S311) as preprocessing for the adhered substance detection processing; processing area setting processing (step S320); outline extraction processing (step S321); inside extraction processing (step S322); extraction judgment processing (step S328); adhered-substance-detected area judgment processing (step S323); accumulation initialization processing (step S329); and lens condition judgment processing (step S324). These processing sequences are executed periodically successively.

(Vehicle Information Acquisition Processing and Vehicle Speed Judgment Processing)

The vehicle information acquisition processing (step S310) and the vehicle speed judgment processing (step S311) are executed by the vehicle information acquisition unit 310 for the processing apparatus 300. In the vehicle information acquisition processing (step S310), a driving speed (vehicle speed) of the vehicle 100 measured by a speed sensor provided in the vehicle 100 is acquired from the vehicle system 1000. In the subsequent vehicle speed judgment processing (step S311), whether or not the vehicle speed is equal to or higher than a specified speed (for example, 10 km/h or higher) is judged. If the vehicle speed is equal to or higher than the specified speed (Yes), the processing proceeds to the next processing area setting processing (step S320); if the vehicle speed is lower than the specified speed (No), the processing for detecting the adhered substance on the lens 210 (processing from step S320 to step S329) is skipped and the processing proceeds to the lens condition judgment processing (step S324). This skipping processing is executed because when the vehicle speed reduces, the processing for excluding the scenery which changes along with traveling of the vehicle 100 from the adhered-substance-detected area does not function effectively and detection errors may increase during the processing for detecting the adhered substance on the lens 210 (processing from step S320 to step S329). However, when the performance of the processing for detecting the adhered substance on the lens 210 (processing from step S320 to step S329) is high and there are few detection errors upon reduction of the vehicle speed, the vehicle information acquisition unit 310, and the vehicle information acquisition processing (step S310), and the vehicle speed judgment processing (step S311) may be omitted.

Incidentally, regarding the vehicle speed judgment processing (step S311), the threshold value for the vehicle speed used for the judgment (vehicle speed judgment threshold value) may not be a fixed value. For example, the judgment threshold value may be changed depending on whether or not the processing for detecting the adhered substance on the lens 210 (the processing from step S320 to step S329) has been skipped in the adhered substance detection processing executed last time. For example, if the processing for detecting the adhered substance on the lens 210 has been skipped, it may be possible to reduce the judgment threshold value so as to make it easier to execute the adhered substance detection processing.

Furthermore, in this embodiment, the vehicle speed is used for a processing branching judgment for the vehicle speed judgment processing (step S311); however, this embodiment is not limited to this example. For example, other information such as the state of a shift lever or the direction of wheels of the vehicle 100 may be used for the judgment criteria. Also, a plurality of pieces of the vehicle information may be combined and used for the judgment criteria. For example, the processing for detecting the adhered substance on the lens 210 may be executed only when the wheels are facing forward and the vehicle speed is 10 km/h or higher.

(Processing Area Setting Processing)

The processing area setting processing (step S320) is executed before executing various processing in the adhered-substance detecting unit 320. The details of the processing area setting processing (step S320) will be explained by using the flowchart in FIG. 4.

Firstly, world coordinates corresponding to each pixel of a captured image by the camera 200 are acquired (step S3201). Under this circumstance, it is assumed that all objects which appear in the captured image are planes without height and the acquired world coordinates are the distance and direction from the vehicle 100.

Next, an area where the adhered substance on the lens may possibly appear in the captured image by the camera 200 (adhered-substance-on-lens appearance area) is acquired (step S3202). For example, it is an area excluding the area which is covered with a camera hood and to which the adhered substance on the lens does not adhere to the lens. However, this embodiment is not limited to this example. There is an area to which the adhered substance on the lens may possibly adhere to the lens, but in which the scenery does not appear even without the adhered substance on the lens, like an area in which the vehicle 100, that is, the vehicle body of the driver's own vehicle appears. The image area excluding this area may be acquired as the adhered-substance-on-lens appearance area.

Subsequently, the adhered-substance detecting unit 320 acquires an area capable of detecting the adhered substance on the lens (adhered-substance-on-lens detectable area) (step S3203). For example, there are areas regarding which the detection performance for detecting the adhered substance degrades, such as ends of the captured image where the entire shape of the adhered substance on the lens cannot be acquired, and far areas regarding which changes caused by traveling of the vehicle 100 are small. The image area excluding these areas is acquired as the adhered-substance-on-lens detectable area.

Next, an area regarding which the ambient sensing by the ambient sensing unit 340 by using the captured image by the camera 200 may possibly be inhibited by the adhered substance on the lens (adhered-substance-on-lens inhibition area) is acquired (step S3204). For example, when the ambient sensing unit 340 detects a parking frame, the function may possibly be inhibited by the adhered substance on the lens, which is overlaid on a road surface that is a detection range, so that the area in which the road surface appears is acquired as the adhered-substance-on-lens inhibition area.

Incidentally, the world coordinates acquired in step S3201 can be used in each of steps S3202 to 3204. For example, in step S3202, the area(s) in which the vehicle body appears in the image is excluded based on the world coordinates; and in step S3203, the area(s) a certain distance or more far from the vehicle 100, regarding which the precision for detecting the adhered substance degrades, is excluded.

Then, a processing area for the adhered substance detection processing is generated by integrating the respective areas acquired in steps S3202 to 3204 (step S3205).

(Outline Extraction Processing)

The outline extraction processing (step S321) is executed by the outline extraction unit 321 for the adhered-substance detecting unit 320 to extract an area having a feature of the outline of the adhered substance on the lens (outline area). An embodiment of this outline extraction processing (step S321) will be explained with reference to the flowchart in FIG. 5.

Firstly, the captured image by the camera 200 is reduced (step S3211). This processing is executed to reduce subsequent processing loads and this processing may be omitted from this embodiment.

Next, an edge image is generated from the reduced captured image (step S3212). Under this circumstance, various known methods can be used to generate the edge image. For example, a method of applying a Sobel filter or a Laplacian filter to the captured image is known.

Subsequently, an edge area(s) with edge intensity of a specified range corresponding to the outline of the adhered substance on the lens is extracted from the edge image generated in step S3212 (step S3213). For example, an area(s) with moderate edge intensity (blur edge area) is extracted. Through this processing, the following are extracted: blurs which appear around the adhered substance on the lens because the distance from the camera 200 is short and the camera 200 is not focused; and shades which appear at the outline of the adhered substance with thickness on the lens.

Incidentally, this embodiment does not limit the edge intensity to be extracted. For example, when the adhered substance on the lens is water droplets, moderate edges may also appear in the scenery which can be seen on the water droplets and the image which can be seen on the water droplets can be also detected by including that edge intensity in the extraction range. Furthermore, when water droplets and water droplet traces are detected as the adhered substance on the lens at night, they glow white with the light of streetlamps and strong edges are generated around their outlines. Therefore, at night (in other words, when the surrounding illuminance level is low), strong edges may be included in the edge intensity to be extracted as the blur edge area(s).

Next, every time the outline extraction processing (step S321) is executed, the blur edge areas extracted by the blur edge area extraction processing (step S3213) are accumulated (step S3214).

Then, if the number of accumulations is equal to or more than a threshold value (outline accumulation judgment threshold value) in the next accumulation count judgment processing (step S3215), the outline area extraction processing (step S3216) is executed; and if the number of accumulations is less than the outline accumulation judgment threshold value, the outline extraction processing (step S321) is terminated. In the outline area extraction processing (step S3216), the blur edge area which has appeared with frequency equal to or more than the outline accumulation judgment threshold value is extracted as the outline area and the outline extraction processing (step S321) is terminated. Through this processing, the blur edge area(s) with the low appearance frequency can be removed as noise. Under this circumstance, the outline accumulation judgment threshold value for the accumulation count judgment processing (step S3215) may not be a fixed value. For example, in a bright scene with much noise, the outline accumulation judgment threshold value may be increased based on a luminance sensor of the camera 200 and the brightness of the captured image. Incidentally, if the blur edge area extracted in step S3213 has little noise, the sequence of the accumulation processing (step S3214) and the accumulation count judgment processing (step S3215) may be omitted.

Through the above-mentioned sequence of processing, the outline of the adhered substance on the lens (the outline area) is extracted.

However, the above-described example is an example of the method for extracting the outline of the adhered substance on the lens and this embodiment is not limited to this example. Other examples are indicated below.

(Another Mode 1 of Outline Extraction Processing)

In the outline extraction processing (step S321), the moderate edges are extracted as the feature of the outline of the adhered substance on the lens, but other features may be used. For example, if the adhered substance on the lens has a peculiar shape, the above-described steps S3212 and S3213 may be replaced with processing for extracting that peculiar shape. For example, when detecting the adhered substance which adheres to the lens and whose outline is circular like a water droplet, the outline area of the water droplet can be extracted by applying circular extraction processing to the captured image. Furthermore, the outline of the adhered substance on the lens is emphasized in the edge image generated in step S3212 and the blur edge area extracted in step S3213, so that the precision for extracting the outline area of the water droplet may be enhanced by applying the circular extraction processing to this edge image and the blur edge area. Under this circumstance, known methods can be used for the circular extraction. For example, circular extraction processing using the Hough transform is known. Incidentally, if this method is used, the outline of the water droplet can be extracted from the blur edge area including noise; and, therefore, the sequence of the accumulation processing (step S3214) and the accumulation count judgment processing (step S3215) for removing the noise can be omitted. However, the accumulation processing (step S3214) and the accumulation count judgment processing (step S3215) also have the effect of suppressing detection errors in the above-mentioned circular extraction, so that if there are many detection errors, the aforementioned accumulation processing, etc. may be executed.

(Another Mode 2 of Outline Extraction Processing)

Furthermore, the sequence of the accumulation processing (step S3214) and the accumulation count judgment processing (step S3215) may be replaced with a known method for reducing the noise. For example, if closing processing is applied to the image from which the blur edge area is extracted in step S3213, isolated noise with no adjacent areas can be deleted.

(Another Mode 3 of Outline Extraction Processing)

Furthermore, the outline of the adhered substance on the lens has features of low dispersion of luminance (luminance dispersion) and a low frequency. So, as another mode of the edge image generation processing (step S3212), the luminance dispersion or the frequency may be extracted for each area having a plurality of pixels; and in the blur edge area extraction processing (step S3213), an area whose luminance dispersion or frequency is within a specified range may be extracted as the blur edge area. Under this circumstance, the range of the luminance dispersion or the frequency to be extracted is set in accordance with blurs and shades at the outline of the adhered substance on the lens. This processing is used to replace the edge image generation processing (step S3212) and the blur edge area extraction processing (step S3213).

(Another Mode 4 of Outline Extraction Processing)

Furthermore, the outline of the adhered substance on the lens has the feature such that its color and luminance change monotonously towards outside of the outline, so that the above-described area (gradation area) may be extracted. For example, if the captured image is scanned in a crosswise direction and an area whose luminance increases or decreases monotonously by a certain change amount over a certain length is extracted, a vertical outline can be extracted. Under this circumstance, the length to be extracted and the change amount are set in accordance with the width of the outline of the adhered substance on the lens and its luminance change amount. This processing is used to replace the edge image generation processing (step S3212) and the blur edge area extraction processing (step S3213).

(Another Mode 5 of Outline Extraction Processing)

Furthermore, the background can be seen through the blurred outline of the adhered substance on the lens, but its luminance differs from the luminance of the original background. If the adhered substance on the lens is dark, the luminance of the background which is visible through the adhered substance on the lens becomes darker; and if the adhered substance on the lens is bright, the luminance of the background which is visible through the adhered substance on the lens becomes brighter. So, an object(s) (such as the road surface) whose position in the captured image has changed by the movement of the vehicle 100 may be extracted and the area whose luminance always changes darker or brighter after the movement of the vehicle 100 than before the movement of the vehicle 100 may be extracted. This processing is used to replace the edge image generation processing (step S3212) and the blur edge area extraction processing (step S3213).

(Another Mode 6 of Outline Extraction Processing)

Furthermore, the outline of the adhered substance on the lens (the blur edge area) can be extracted by combining a plurality of the above-described processing sequences for extracting different features of the outline of the adhered substance on the lens.

(Inside Extraction Processing)

Next, the inside extraction processing (step S322) is executed by the inside extraction unit 322 for the adhered-substance detecting unit 320 to extract an area having a feature of the area inside the outline of the adhered substance on the lens (inside area). An embodiment of this inside extraction processing (step S322) will be explained with reference to the flowchart in FIG. 6.

Firstly, the captured image by the camera 200 is reduced (step S3221). This processing is executed to reduce the subsequent processing loads and this processing may be omitted in this embodiment. Furthermore, this processing may be omitted by using the image generated by the captured image reduction processing (step S3221) of the outline extraction processing (step S321).

Next, an edge image is generated from the reduced captured image (step S3222). Under this circumstance, various known methods can be used to generate the edge image. For example, a method of applying a Sobel filter or a Laplacian filter to the captured image is known. Incidentally, this processing may be omitted by using the edge image generated by the edge image generation processing (step S3222) of the outline extraction processing (step S321).

Incidentally, in this step S3222, an edge image with emphasized fine edges which appear on, for example, the road surface may be generated in order to emphasize the difference between the area(s) of the adhered substance on the lens and an area(s) which is not the adhered substance on the lens. For example, since information of the fine edges is lost by the captured image reduction processing (step S3221), the fine edges can be emphasized by omitting this processing.

Subsequently, an area(s) with edge intensity corresponding to the area inside the outline of the adhered substance on the lens is extracted from the edge image generated in step S3222 (step S3223). For example, an area with almost no edge intensity (small edge area) (in other words, a weaker edge area than the outline area extracted in the outline extraction processing (step S321) or an area with no edge intensity) is extracted. Through this processing, the adhered substance on the lens, in which almost no edge appears because the distance from the camera 200 is short and the camera 200 is not focused, can be extracted. The edge intensity extracted in this step S3223 is set in accordance with the weak edge intensity in the inside area of the outline of the adhered substance on the lens.

Incidentally, this embodiment does not limit the edge intensity to be extracted. For example, when the adhered substance on the lens is water droplets, moderate edges may also appear in the scenery which can be seen on the water droplets and the image which can be seen on the water droplets can be also detected by including that edge intensity in the extraction range.

Next, every time the inside extraction processing (step S322) is executed, the small edge areas extracted by the small edge area extraction processing (step S3223) are accumulated (step S3224).

Then, if the number of accumulations is equal to or more than a threshold value (inside accumulation judgment threshold value) in the next accumulation count judgment processing (step S3225), the inside area extraction processing (step S3226) is executed; and if the number of accumulations is less than the inside accumulation judgment threshold value, the inside extraction processing (step S322) is terminated. In the inside area extraction processing (step S3226), a small edge area which has appeared with frequency equal to or more than the inside accumulation judgment threshold value is extracted as the inside area and the inside extraction processing (step S322) is terminated. Through this processing, the small edge area(s) with the low appearance frequency can be removed as noise. Under this circumstance, the inside accumulation judgment threshold value for the accumulation count judgment processing (step S3225) may not be a fixed value. For example, in a bright scene with much noise, the inside accumulation judgment threshold value may be increased based on the luminance sensor of the camera 200 and the brightness of the captured image. Incidentally, if the small edge area extracted in step S3223 has little noise, the sequence of the accumulation processing (step S3224) and the accumulation count judgment processing (step S3225) may be omitted.

Through the above-mentioned sequence of processing, the area inside the outline of the adhered substance on the lens (the inside area) is extracted.

However, the above-described example is an example of the method for extracting the area inside the outline of the adhered substance on the lens and this embodiment is not limited to this example. Other examples are indicated below.

(Another Mode 1 of Inside Extraction Processing)

Since the adhered substance such as mud on the lens blocks the natural light, the luminance of the area inside the outline is low. So, the area with low luminance is extracted as the area inside the outline of the adhered substance on the lens (small edge area). This processing is used to replace the edge image generation processing (step S3222) and the small edge area extraction processing (step S3223).

(Another Mode 2 of Inside Extraction Processing)

Furthermore, when water droplets and water droplet traces are detected as the adhered substance on the lens at night, they glow white with the light of streetlamps at night; and, therefore, this processing may be designed as processing for extracting an area with high luminance at night. Under this circumstance, the range of the luminance to be extracted is set in accordance with the water droplets and the water droplet traces which glow white at night with the light of the streetlamps. This processing is used to replace the edge image generation processing (step S3222) and the small edge area extraction processing (step S3223).

(Another Mode 3 of Inside Extraction Processing)

Furthermore, the area inside the outline of the adhered substance on the lens in a captured color image(s) photographed by the camera 200 often has grayish colors. So, an area(s) of the grayish colors is extracted as the area inside the outline of the adhered substance on the lens (small edge area). This processing is used to replace the edge image generation processing (step S3222) and the small edge area extraction processing (step S3223).

(Another Mode 4 of Inside Extraction Processing)

Furthermore, there is a method of acquiring a pattern shape of the area inside the outline of the adhered substance on the lens in advance and extracting the small edge area of the area inside the outline of the adhered substance on the lens by means of matching with the acquired pattern shape (pattern matching). This processing is used to replace the edge image generation processing (step S3222) and the small edge area extraction processing (step S3223). Incidentally, the method of using the pattern in this example is not limited to this example. For example, an edge pattern of the outline of the adhered substance on the lens may be used. In this case, a pattern may be extracted from the edge image generated by the edge image generation processing (step S3222).

(Another Mode 5 of Inside Extraction Processing)

For example, if the adhered substance on the lens has a peculiar shape, the above-described steps S3222 and S3223 may be replaced with processing for extracting that peculiar shape. For example, when detecting the adhered substance, whose shape is circular like a water droplet, on the lens, the water droplet can be extracted by applying circular extraction processing to the captured image. This processing is used to replace the edge image generation processing (step S3222) and the small edge area extraction processing (step S3223). Incidentally, the circular extraction processing may be applied to the edge image generated in step S3222 and the small edge area extracted in step S3223. Known methods can be used for the circular extraction. For example, there are a method of using processing for matching with the circular shape and a method using the Hough transform. When using the Hough transform, the outline of the circular area can be extracted by using the Hough transform after extracting the outline of the small edge area by the edge extraction processing. If these methods are used, the area inside the outline of the water droplet (the small edge area) can be extracted from the small edge area including noise; and, therefore, the sequence of the accumulation processing (step S3224) and the accumulation count judgment processing (step S3225) for removing the noise can be omitted. However, this accumulation processing (step S3224) and the accumulation count judgment processing (step S3225) also have the effect of suppressing detection errors in the above-mentioned circular extraction, so that if there are many detection errors, the aforementioned accumulation processing, etc. may be executed.

(Another Mode 6 of Inside Extraction Processing)

Furthermore, the sequence of the accumulation processing (step S3224) and the accumulation count judgment processing (step S3225) may be replaced with a known method for reducing the noise. For example, if the closing processing is applied to the image with the small edge area extracted in step S3223, isolated noise with no adjacent areas can be deleted. Furthermore, if there is less noise in the small edge area extracted in step S3223, the sequence of the accumulation processing (step S3214) and the accumulation count judgment processing (step S3215) may be omitted.

(Another Mode 7 of Inside Extraction Processing)

Furthermore, the area inside the outline of the adhered substance on the lens has features of low luminance dispersion and also a low frequency. So, in the edge image generation processing (step S3222), the luminance dispersion or the frequency may be extracted for each area having a plurality of pixels; and in the small edge area extraction processing (step S3223), an area whose luminance dispersion or frequency is equal to or less than a threshold value may be extracted as the small edge area. Under this circumstance, the threshold value for the luminance dispersion or the frequency to be extracted is set in accordance with the features of the area inside the outline of the adhered substance on the lens.

(Another Mode 8 of Inside Extraction Processing)

Furthermore, in many cases, the background cannot be seen through the area inside the outline of the adhered substance on the lens. So, an object(s) (such as the road surface) whose position in the captured image has changed by the movement of the vehicle 100 may be extracted and the area whose luminance always changes to a certain value or only by a certain amount after the movement of the vehicle 100 as compared to the luminance before the movement of the vehicle 100 may be extracted. These processing sequences are used to replace the edge image generation processing (step S3222) and the small edge area extraction processing (step S3223).

(Another Mode 9 of Inside Extraction Processing)

Furthermore, the area inside the outline of the adhered substance on the lens (the small edge area) can be extracted by combining a plurality of the above-described processing sequences for extracting different features of the area inside the outline of the adhered substance on the lens.

Incidentally, the respective processing steps of the outline extraction processing (step S321) and the inside extraction processing (step S322) can be executed in a random order.

(Extraction Judgment Processing)

Next, the extraction judgment processing (S328) is executed by the adhered-substance-detected area judgment unit 323 for the adhered-substance detecting unit 320; and (the outline extraction processing (step S321) by) the outline extraction unit 321 judges whether the outline area is extracted or not and (the inside extraction processing (step S322) by) the inside extraction unit 322 judges whether the inside area is extracted or not. If the outline area and the inside area have been extracted, the subsequent adhered-substance-detected area judgment processing (step S323) and the accumulation initialization processing (step S329) are executed; and if the outline area and the inside area have not been extracted, these processing steps (steps S323 and S329) are skipped and the processing proceeds to the lens condition judgment processing (step S324).

(Adhered-Substance-Detected Area Judgment Processing)

The adhered-substance-detected area judgment processing (step S323) is executed by the adhered-substance-detected area judgment unit 323 for the adhered-substance detecting unit 320; and every time the outline extraction unit 321 and the inside extraction unit 322 extract the outline area and the inside area, respectively, whether or not the outline area is the outline of the adhered substance on the lens and whether or not the inside area is the area inside the outline are judged, thereby detecting the area of the adhered substance which adheres to the lens 210 (adhered-substance-detected area).

Figure 7:
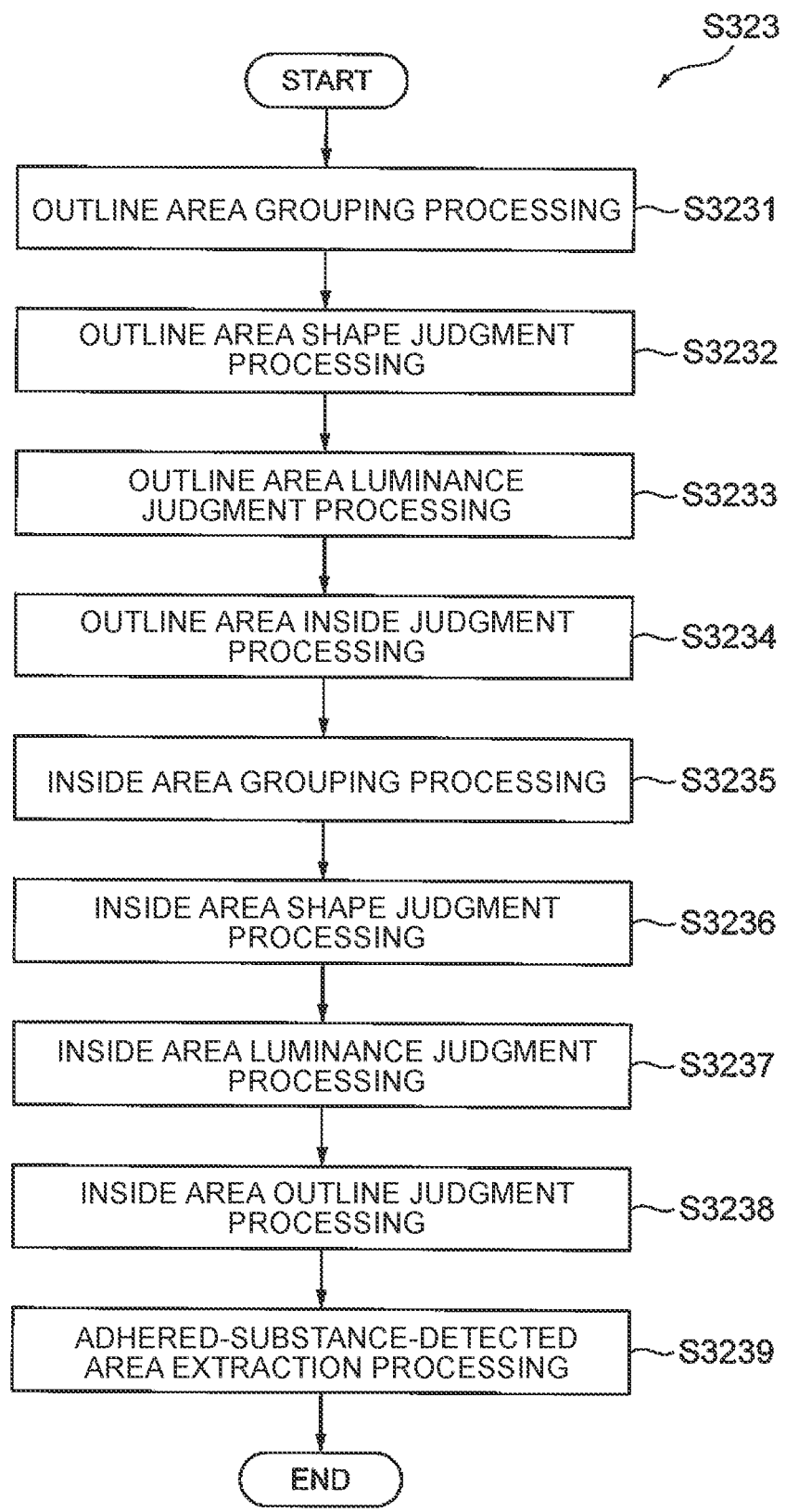
FIG. 7 is an overview flowchart illustrating a flow of adhered-substance-detected area judgment processing.

An embodiment of this adhered-substance-detected area judgment processing (step S323) will be explained with reference to the flowchart in FIG. 7.

(Outline Area Grouping Processing)

Firstly, outline areas which were extracted by the aforementioned outline extraction processing (step S321) and are continuously connected to each other are grouped (grouping) (step S3231). Known grouping processing can be used for this grouping and, for example, image labeling processing may be used.

(Outline Area Shape Judgment Processing)

Next, regarding each of the outline areas grouped in step S3231, whether the feature of that shape corresponds to (or matches) the feature of the outline of the adhered substance on the lens or not is judged through comparison (step S3232).

Although the feature of the shape varies depending on the type of the adhered substance on the lens, having a certain width and an upper limit of the planar dimension is a universal feature. Therefore, whether the width and planar dimension of each outline area group are within a specified range or not may be judged.

Furthermore, in a case of a circular adhered substance like a water droplet on the lens, the circular judgment may be conducted with respect to the grouped outline areas. A known method can be used for the circular judgment. For example, by using circular extraction processing by the Hough transform, whether or not any circular shape can be extracted within a processing range can be judged.

However, the entire picture of the outline of the adhered substance on the lens does not appear in the edge image depending on the edge image generation method for the edge image generation processing (step S3212) of the outline extraction processing (step S321). For example, when the edge image is generated by using the Sobel filter which extracts edges in a crosswise direction, only a vertically long portion of the outline of the adhered substance on the lens is extracted in the edge image. Therefore, the above-mentioned circular judgment does not function effectively on the circular water droplets. In this case, whether the length and inclination of the grouped outline areas are within a specified range or not may be judged. The inclination of the area can be found by, for example, collinear approximation. Known methods can be used for this collinear approximation and, for example, straight line extraction by the least-squares method or the Hough transform can be used. Furthermore, regarding an inclined straight line, an area ratio (rectangle occupancy rate) to a rectangle surrounding the area decreases, so that, for example, this rectangle occupancy rate may be used as a value based on an angle of inclination.

(Outline Area Luminance Judgment Processing)

Next, regarding the outline area group on which the shape judgment was conducted, whether its luminance has (or matches) the luminance feature of the outline of the adhered substance on the lens or not is judged through comparison (step S3233).

Since faint luminance extends over the outline of the adhered substance on the lens, for example, dispersion of the luminance value for each grouped outline area is found and whether the dispersion is within a specified range or not is judged. However, this embodiment is not limited to this example. Besides the above-described example, a frequency component may be found for each grouped outline area and whether an average frequency component is within a specified range or not may be judged.

Furthermore, the outline of the adhered substance on the lens has the feature such that its color and luminance change monotonously towards the outside of the outline, so that the above-described area (gradation area) may be extracted. For example, the captured image may be scanned in a crosswise direction and an area whose luminance increases or decreases monotonously over a certain length and by a certain change amount may be extracted. Under this circumstance, the certain length and the change amount are set in accordance with the width of the outline of the adhered substance on the lens and its luminance change amount.

(Outline Area Inside Judgment Processing)

Next, regarding the outline area group whose shape and luminance have been judged, whether it is adjacent to the inside of the adhered substance on the lens or not is judged (step S3234). Normally, not only the outline, but also the inside appears with the adhered substance on the lens; and, therefore, it is judged that an outline area which is not adjacent to the inside of the adhered substance on the lens is not the adhered substance on the lens, so that such an outline area is excluded. For example, the small edge area extracted by the inside extraction unit 322 can be used as the inside of the adhered substance on the lens.

However, if the grouped outline is small, the size of the corresponding adhered substance on the lens may be small and its inside area may not sometimes be extracted. So, if the outline is small, the inside area with a weak feature which is not extracted by the inside extraction processing (step S322) may be used. This inside area with the weak feature can be generated by, for example, another small edge extraction processing by extending the range of the edge intensity extracted by the inside extraction processing (step S322) in the small edge area extraction processing (step S3223) to stronger intensity.

Through these processing steps, the outline of the adhered substance on the lens (the adhered substance outline area) is detected from the outline area extracted by the outline extraction processing (step S321). By extracting only the outline of the adhered substance on the lens as described above, for example, a small-piece adhered substance, regarding which a proportion of its outline is large, on the lens can be also detected effectively.

Incidentally, various judgment processing sequences used in steps S3232 to S3234 can be executed in a random order and not all of them have to be executed. Furthermore, two or more judgment processing sequences may be combined and the judgement may be made in a complexed manner.

(Inside Area Grouping Processing)

Next, the inside areas which were extracted by the aforementioned inside extraction processing (step S322) and are continuously connected to each other are grouped (grouping) (step S3235). Known grouping processing can be used for this grouping and, for example, image labeling processing may be used.

(Inside Area Shape Judgment Processing)

Next, regarding each of the inside areas grouped in step S3235, whether that shape has (or matches) the feature appropriate for the shape of the area inside the outline of the adhered substance on the lens (step S3236).

Although the feature of the shape varies depending on the type of the adhered substance on the lens, having a certain width and a lower limit and an upper limit of the planar dimension is a universal feature. Therefore, whether the width and planar dimension of the grouped inside areas are within a specified range or not may be judged.

Furthermore, besides the above, the adhered substance on the lens has the feature such that it tends to agglomerate. So, the vertical width and the horizontal width of the adhered substance on the lens tend to become almost the same and an occupancy rate to a bounding rectangle (rectangle occupancy rate) tends to easily become approximately a circle value (0.785). Therefore, the aspect ratio and the bounding rectangle occupancy rate of the grouped inside areas is within a specified range or not may be judged.

Furthermore, in a case of a circular adhered substance like a water droplet on the lens, the circular judgment may be performed on the grouped inside areas. A known method can be used for the circular judgment. For example, if the outline of the inside area is extracted by, for example, outline tracking processing, circularity can be found based on the relationship between the length of the outline and the planar dimension of the inside area and whether the circularity is equal to or more than a threshold value or not can be judged. Under this circumstance, the water droplet may become oval, ellipticity of the area may be found and degradation of the circularity due to ovalization may be corrected. Furthermore, the Hough transform which is known as a method of the circular judgment may be used. Whether the inside area is of a circular shape or not can be judged by executing the circular extraction processing by the Hough transform on the outline extracted by, for example, the outline tracking processing. Incidentally, if this method is used, a defective part(s) of the inside area which is partially missing can be complemented.

(Inside Area Luminance Judgment Processing)

Next, regarding the inside area group on which the shape judgment has been performed, whether or not its luminance has (or matches) a feature of the luminance of the area inside the outline of the adhered substance on the lens is judged through comparison (step S3237).

Since similar luminance extends in the area inside the outline of the adhered substance on the lens, for example, a luminance value of each of the grouped inside areas is found and whether dispersion is within a specified range or not is judged. However, this embodiment is not limited to this example. Besides the above, a frequency component of each of the grouped inside areas may be found and whether an average frequency component is within a specified range or not may be judged.

Furthermore, the area inside the adhered substance on the lens has the features such that the natural light hardly transmits through the inside area and the inside area is colorless and its luminance is low. For example, a proportion of grayish colors and the average luminance of each of the grouped inside areas may be acquired and an inside area regarding which the proportion of grayish colors is high and the average luminance is low may be extracted.

(Inside Area Outline Judgment Processing)

Next, regarding the inside area group on which the shape and the luminance have been judged, whether this inside area group is adjacent to the outline of the adhered substance on the lens or not is judged (step S3238). Normally, since the outline appears at the adhered substance on the lens, the outline of the adhered substance on the lens does not lie adjacent to it (that is, it does not have the feature of the outline of the adhered substance outside) and the inside area is judged to be something which is not the adhered substance on the lens; and, therefore, such inside area is excluded. The blur edge area extracted by the outline extraction unit 321 can be used as the outline of this adhered substance on the lens.

However, if the adhered substance on the lens is a water droplet(s) without thickness, the scenery is projected onto the water droplet(s) and the outline of the water droplet(s) can thereby hardly be seen. So, an outline area with a weak feature which is not extracted by the outline extraction processing (step S321) (in other words, the outline area with a weaker feature than that of the outline area extracted by the outline extraction unit 321) may be included in the blur edge area. This outline area with the weak feature can be generated by, for example, another blurred edge extraction processing by extending the range of the edge intensity, which is extracted by the outline extraction processing (step S321) in the blurred edge extraction processing (step S3213), to weak intensity.

Through these processing sequences, the area inside the outline of the adhered substance on the lens (adhered substance inside area) is detected from the inside area extracted by the inside extraction processing (step S322). In this way, for example, the adhered substance, whose outline is weak, on the lens can also be detected effectively by extracting only the area inside the adhered substance on the lens.

Incidentally, various judgment processing sequences used in steps S3236 to S3238 can be executed mutually in a random order and not all of them have to be executed. Furthermore, two or more judgment processing sequences may be combined and the judgement may be made in a complexed manner.

(Adhered-Substance-Detected Area Extraction Processing)

Lastly, the areas extracted as the adhered substance outline area and the adhered substance inside area in the aforementioned processing (steps S3231 to S3238) are overlaid one another and then extracted as an adhered-substance-detected area (step S3239).

Under this circumstance, the adhered-substance-detected area may be decided by combining the adhered substance outline area with the adhered substance inside area. For example, if only the areas detected with the adhered substance outline area and the adhered substance inside area adjacent to each other (in other words, the adhered substance outline area and the adhered substance inside area which are adjacent to each other) are detected as the adhered-substance-detected area, only the clear adhered substance, which has the outline, on the lens can be detected.

However, in the above-described embodiment, if only either one of the adhered substance outline area and the adhered substance inside area is detected, the adhered substance on the lens cannot be detected. In this case, if both the adhered substance outline area and the adhered substance inside area are detected as the adhered-substance-detected area, it is possible to detect various adhered substances on the lens such as an adhered substance which adheres to the lens and whose outline is weak like water droplets without thickness and an small-piece adhered substance which adheres to the lens and which has almost no inside area.

Furthermore, in the adhered-substance-detected area judgment processing (step S323), reference may be made to the adhered substance outline areas and the adhered substance inside areas, or the adhered-substance-detected areas which were detected in the past and only the adhered substance outline area and the adhered substance inside area, or the adhered-substance-detected area with high detection frequency may be used as final outputs.

Incidentally, in this embodiment, the outline area and the inside area are treated independently and the adhered substance outline area and the adhered substance inside area are detected from the outline area and the inside area, respectively; however, it is a matter of course that the outline area and the inside area may be synthesized together and then the shape and the luminance may be judged. In this case, it becomes impossible to use different features for the judgment for the outline and the inside area, but it is possible to reduce the amount of the judgment processing based on the shape and the luminance and reduce the processing load.

(Accumulation Initialization Processing)

Next, in the accumulation initialization processing (step S329), the blur edge areas accumulated by the accumulation processing (step S3214) of the outline extraction processing (step S321) and the number of accumulations are initialized. Furthermore, similarly, the small edge areas accumulated by the accumulation processing (step S3224) of the inside extraction processing (step S322) and the number of accumulations are initialized. Accordingly, when the adhered-substance-detected area detection processing is executed next time, the outline area and the inside area are newly extracted again by the outline extraction processing (step S321) and the inside extraction processing (step S322), respectively.

Incidentally, this accumulation initialization processing (step S329) may be designed to delete only old accumulated data from among the accumulated blur edge areas and small edge areas.

Furthermore, if the timing to extract the outline area and the timing to extract the inside area are different from each other, the adhered-substance-detected area judgment processing (step S323) and the accumulation initialization processing (step S329) may be executed only one of the extracted areas which are the outline area and the inside area.

(Lens Condition Judgment Processing)

Next, the lens condition judgment processing (step S324) is executed by the lens condition judgment unit 324 for the adhered-substance detecting unit 320 and the dirtiness of the lens 210 for the camera 200 is judged based on the adhered-substance-detected area detected by the adhered-substance-detected area judgment processing (step S323).

For example, whether the lens 210 is severely dirty or not is detected by defining the total planar dimension of the adhered-substance-detected area detected by the adhered-substance-detected area judgment processing (step S323) as dirtiness and judging whether this value exceeds a threshold value or not. Under this circumstance, a contribution rate of the adhered-substance-detected area to the dirtiness may be changed according to, for example, the size and position of the adhered-substance-detected area, the precision of the adhered-substance-detected area judgment processing (step S323) according to the position, and the vehicle speed or the detection duration. For example, if it is known that detection errors of adhered-taint-substance detection processing increase at the center of the captured image when the vehicle speed reduces, it is effective to reduce the contribution rate to the dirtiness (in other words, the size of the index indicating the dirtiness of the lens 210) with respect to the adhered-substance-detected area at the center of the captured image when the vehicle speed reduces. Furthermore, as long as the size of the adhered substance on the lens does not exceed a specified planar dimension and if the detection performance of the ambient sensing unit 340 does not degrade, the contribution rate to the dirtiness may be increased only for each one of the grouped adhered-substance-detected areas whose planar dimension exceeds the specified planar dimension. Furthermore, regarding the ambient sensing unit 340, if the importance of the ambient sensing result changes depending on the image position of the relevant adhered-substance-detected area, the contribution rate to the dirtiness may be changed according to the image position of the adhered-substance-detected area.

Furthermore, the contribution rate to the dirtiness may be changed depending on the type of the detected adhered substance on the lens. The type of the adhered substance on the lens includes not only whether the outline or the inside area, but also directly the kind of the adhered substance on the lens, whether it is a water droplet, mud, fog, or so on. The type of the adhered substance on the lens can be detected by optimizing detection parameters and processing for various kinds of adhered substances on the lens in the adhered substance detection processing by the adhered-substance detecting unit 320. For example, when the adhered substance on the lens is thin fog, the background can be visually recognized through the fog, it is possible to decrease the contribution rate to the dirtiness.

[Advantageous Effects of Embodiment 1]

In this embodiment 1 described above, by detecting the outline and the inside area of the adhered substance on the lens, respectively, the adhered substance(s) (the area to which it adheres) such as water droplets, mud, and dust which adheres to the lens 210 or the like for the camera 200 and which appears in the captured image(s) photographed by the camera 200, including those whose outlines are unclear, can be detected with high precision.

Meanwhile, in this embodiment, if a wide area which is not the area inside the outline of the adhered substance on the lens is included in the small edge area extracted by the small edge area extraction processing (step S3223) of the inside extraction processing (step S322), the area may be cut off by the accumulation processing (step S3224) and the shape of the cut-off area may sometimes become close to the feature of the inside area of the adhered substance on the lens. Similarly, if a wide area which is not the outline of the adhered substance on the lens is included in the blur edge area extracted by the blur edge area extraction processing (step S3213) of the outline extraction processing (step S321), the area may be cut off by the accumulation processing (step S3214) and the shape of the cut-off area may sometimes become close to the feature of the outline of the adhered substance on the lens. As a result, there is a possibility that the adhered-substance-detected area judgment processing (step S323) may not exclude the above-described area and result in a detection error. So, the adhered-substance-detected area judgment processing (step S323) may be also executed before the accumulation on the small edge area extracted by the small edge area extraction processing (step S3223) of the inside extraction processing (step S322) and the blur edge area extracted by the blur edge area extraction processing (step S3213) of the outline extraction processing (step S321). However, in this case, the processing load increases, so that simple processing can be used for this purpose. For example, the outline area or the inside area whose planar dimension is significantly reduced by the accumulation processing (step S3214, S3224) may be excluded in advance.

Embodiment 2

Next, adhered substance detection processing by the adhered-substance detecting unit (adhered-substance detecting apparatus) 320 according to Embodiment 2 will be explained with reference to FIGS. 15 and 16. This Embodiment 2 has a similar configuration to that of Embodiment 1 described above, except that an adhered-substance-detected area tracking unit 325 is added to the adhered-substance detecting unit 320. So, the configuration of the adhered-substance detecting unit 320 according to Embodiment 2 will be explained by using FIG. 15 and the adhered substance detection processing by the adhered-substance detecting unit 320 according to Embodiment 2 will be explained by using FIG. 16; however, regarding the configuration and processing which are the same as those of Embodiment 1 described above, the same reference numerals are assigned and any detailed explanation about them has been omitted, and only the difference between them will be explained below in detail.

Figure 15:
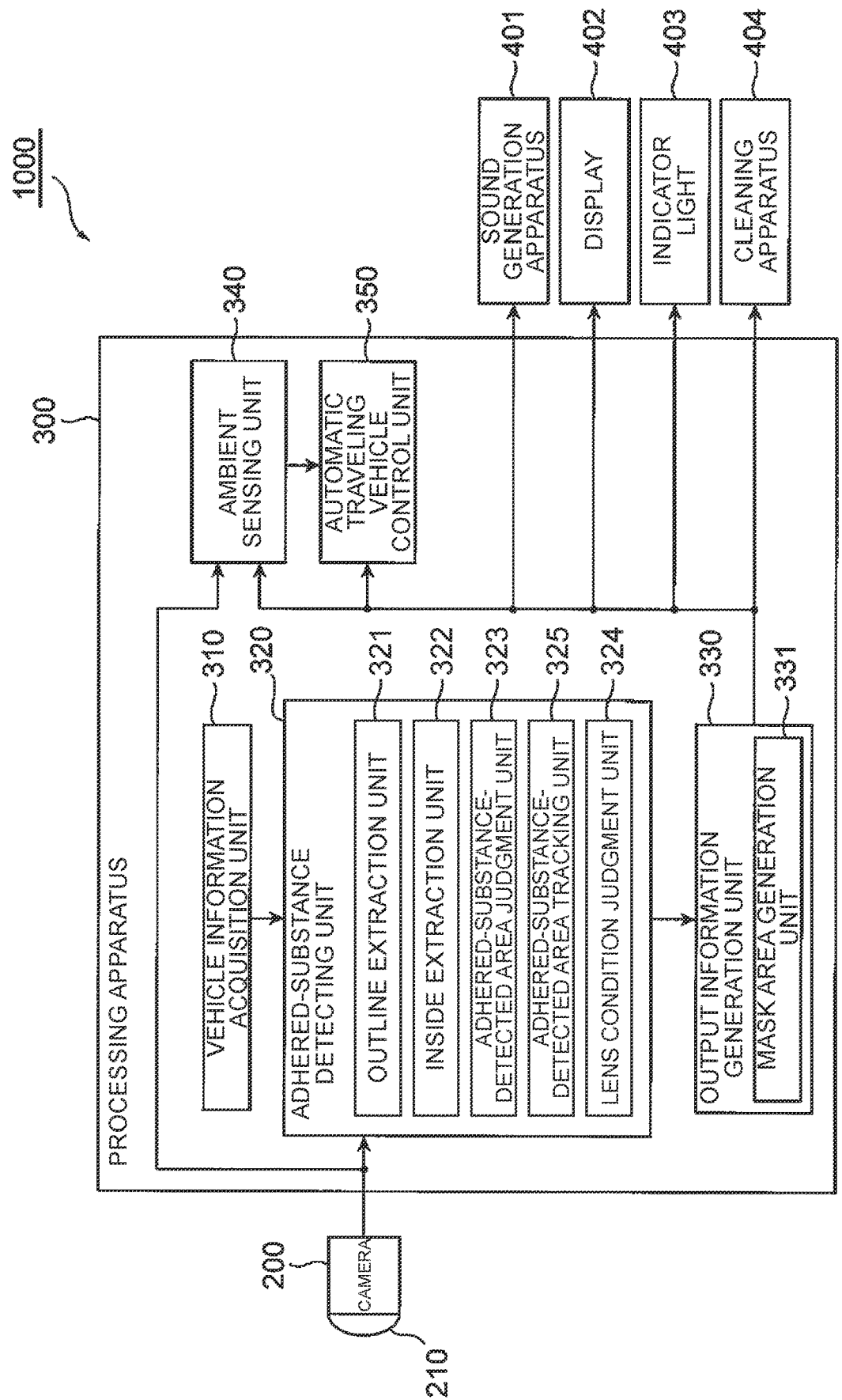
FIG. 15 is a block diagram illustrating the configuration of a vehicle system equipped with an adhered-substance detecting apparatus according to Embodiment 2.

The adhered-substance-on-lens detecting unit 320 according to Embodiment 2 includes an adhered-substance-detected area tracking unit 325 for tracking the area of the adhered substance on the lens (the adhered-substance-detected area), which was detected by the adhered-substance-detected area judgment unit 323 as illustrated in FIG. 15.

Figure 16:
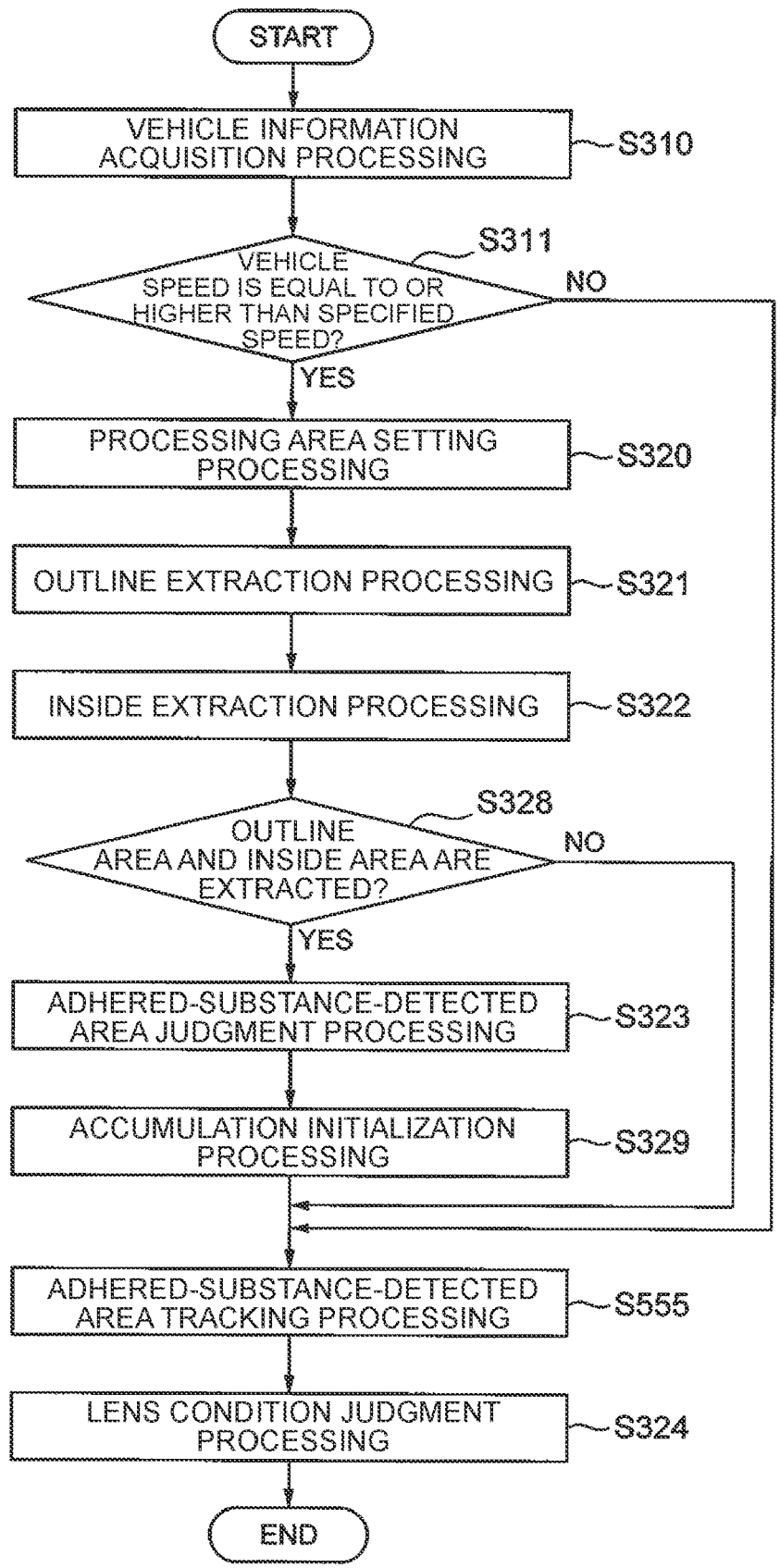
FIG. 16 is an overview flowchart illustrating a flow of adhered substance detection processing by an adhered-substance detecting apparatus according to Embodiment 2.

Furthermore, this adhered-substance-detected area tracking unit 325 executes adhered-substance-detected area tracking processing (step S555) illustrated in FIG. 16 in the adhered substance detection processing by the adhered-substance detecting unit 320.

In the adhered-substance-detected area tracking processing (step S555) illustrated in FIG. 16, the adhered-substance-detected area detected in the adhered-substance-detected area judgment processing (step S323) is tracked. Known tracking processing can be used for this tracking processing. For example, pattern matching may be performed with respect to the area including the vicinity of the adhered-substance-detected area. An image to be used for this pattern matching may be the captured image or its edge image. The area which has been successfully tracked is recognized as the detected area of the adhered substance on the lens (adhered-substance-detected area) regardless of the result of the adhered-substance-detected area judgment processing (step S323) in the previous stage, thereby making it possible to prevent any breaks in continuity of the detection due to, for example, disturbances.

Incidentally, regarding the adhered-substance-detected area (including the adhered substance outline area and the adhered substance inside area) which has been detected once in the past, or the adhered-substance-detected area which has been detected continuously stably, the outline extraction unit 321, the inside extraction unit 322, and the adhered-substance-detected area judgment unit 323 may relax extraction conditions (such as the extraction range of the edge intensity and the accumulation time) for the outline extraction processing (step S321), the inside extraction processing (step S322), and the adhered-substance-detected area judgment processing (step S323) with respect to the image area including the above-described area, thereby preventing any breaks in continuity of the detection due to, for example, disturbances.

Furthermore, if the adhered substance on the lens is a water droplet(s), components of the outline may sometimes appear inside of the adhered substance on the lens due to changes of the natural light. So, in the aforementioned processing for detecting the adhered substance inside area, the outline area extracted by the outline extraction processing may be treated as the inside area with respect to the adhered substance inside area which has been detected once in the past or which has been detected continuously stably. Furthermore, similarly, the adhered substance outline area may be treated as the adhered substance inside area. As a result, it is possible to prevent any break in temporal continuity of the inside area or the adhered substance inside area. Similarly, in the aforementioned processing for detecting the adhered substance outline area, the inside area extracted by the inside extraction processing may be treated as the outline area with respect to the adhered substance outline area which has been detected once in the past or which has been detected continuously stably.

Incidentally, the present invention is not limited to the aforementioned embodiment, and includes various variations. For example, the aforementioned embodiment has been described in detail in order to explain the invention in an easily comprehensible manner and is not necessarily limited to the embodiment having all the configurations explained above. Furthermore, part of the configuration of a certain embodiment can be replaced with the configuration of another embodiment and the configuration of another embodiment can be added to the configuration of a certain embodiment. Also, regarding part of the configuration of each embodiment, the configuration of another configuration can be added to, deleted from, or replaced with the above-mentioned part of the configuration.

Furthermore, each of the aforementioned configurations, functions, processing units, processing means, etc. may be implemented by hardware by, for example, designing part or all of such configurations, functions, processing units, and processing means by using integrated circuits or the like. Moreover, each of the aforementioned configurations, functions, etc. may be implemented by software by processors interpreting and executing programs for realizing each of the functions. Information such as programs, tables, and files for realizing each of the functions may be retained in memories, storage devices such as hard disks and SSDs (Solid State Drives), or storage media such as IC cards, SD cards, and DVDs.

Furthermore, control lines and information lines which are considered to be necessary for the explanation are illustrated; however, not all control lines or information lines are necessarily indicated in terms of products. Practically, it may be assumed that almost all components are connected to each other.

REFERENCE SIGNS LIST

100: vehicle
200: camera (imaging apparatus)
210: lens
220: image sensor
300: processing apparatus
310: vehicle information acquisition unit
320: adhered-substance detecting unit (adhered-substance detecting apparatus)
321: outline extraction unit
322: inside extraction unit
323: adhered-substance-detected area judgment unit
324: lens condition judgment unit
325: adhered-substance-detected area tracking unit
330: output information generation unit
331: mask area generation unit
340: ambient sensing unit
350: automatic traveling vehicle control unit
401: sound generation apparatus
402: display
403: indicator light
404: cleaning apparatus
1000: vehicle system

What is claimed is:

1. An adhered-substance detecting apparatus for detecting an adhered substance appearing in a captured image photographed by an imaging apparatus installed at a moving body, the adhered-substance detecting apparatus comprising:
an outline extraction unit that extracts an area of an outline of the adhered substance from the captured image as an outline area;
an inside extraction unit that extracts an area being inside the outline of the adhered substance from the captured image as an inside area;
an adhered-substance-detected area judgment unit that:
compares the outline area with an outline of a first predetermined adhered substance and detects the outline area with either one of matching shape and matching luminance as an adhered substance outline area,
compares the inside area with an area being inside an outline of a second predetermined adhered substance and detects the inside area with either one of matching shape and matching luminance as an adhered substance inside area, and
detects an area of the adhered substance, which is composed of either one of an outline of an adhered substance and an area being inside an outline of an adhered substance, as an adhered-substance-detected area from either one of the adhered substance outline area and the adhered substance inside area.

2. The adhered-substance detecting apparatus according to claim 1,
wherein the outline extraction unit extracts an edge area with a specified range of edge intensity from the captured image as the outline area; and the inside extraction unit extracts either one of a weaker edge area than the outline area and an area with no edge intensity, as the inside area, from the captured image.

3. The adhered-substance detecting apparatus according to claim 1, further comprising a lens condition judgment unit that judges dirtiness of a lens for the imaging apparatus on the basis of the adhered-substance-detected area.

4. The adhered-substance detecting apparatus according to claim 3,
wherein the lens condition judgment unit changes a size of an index indicating the dirtiness of the lens according to a position of the adhered-substance-detected area.

5. The adhered-substance detecting apparatus according to claim 1,
wherein the adhered-substance-detected area judgment unit excludes an area which is the inside area and which does not have the outline of the adhered substance as its outside, from the adhered substance inside area.

6. The adhered-substance detecting apparatus according to claim 5,
wherein the adhered-substance-detected area judgment unit does not exclude the inside area having a weak outline area as its outside, which is obtained when the outline extraction unit relaxes an extraction condition than an extraction condition to extract the outline area, from the adhered substance inside area.

7. The adhered-substance detecting apparatus according to claim 1,
wherein the adhered-substance-detected area judgment unit detects the adhered substance outline area and the adhered substance inside area together as the adhered-substance-detected area.

8. The adhered-substance detecting apparatus according to claim 1,
wherein the adhered-substance-detected area judgment unit detects the adhered substance outline area and the adhered substance inside area, which are adjacent to each other, as the adhered-substance-detected area.

9. The adhered-substance detecting apparatus according to claim 1, further comprising an adhered-substance-detected area tracking unit for tracking the adhered-substance-detected area.

10. The adhered-substance detecting apparatus according to claim 9,
wherein regarding the adhered substance inside area detected by the adhered-substance-detected area judgment unit in the past, either one of the outline area and the adhered substance outline area is treated as either one of the inside area and the adhered substance inside area.

11. The adhered-substance detecting apparatus according to claim 9,
wherein by referring to either one of the adhered substance outline area and the adhered substance inside area which were detected by the adhered-substance-detected area judgment unit in the past, or the adhered-substance-detected area, either one of the outline extraction unit and the inside extraction unit relaxes an extraction condition of either one of the outline area and the inside area with respect to an image area including the above-described area.

12. A vehicle system comprising:
the adhered-substance detecting apparatus stated in claim 1;
the imaging apparatus that is mounted in a vehicle and captures images of surroundings of the vehicle; and
an ambient sensing unit that changes operation on the basis of the adhered-substance-detected area detected by the adhered-substance-detected area judgment unit and detects an object and/or a sign regarding a captured image photographed by the imaging apparatus.

* * * * *